US012469632B2

(12) United States Patent
Tobita et al.

(10) Patent No.: US 12,469,632 B2
(45) Date of Patent: Nov. 11, 2025

(54) MULTILAYER COIL COMPONENT

(71) Applicant: TDK CORPORATION, Tokyo (JP)

(72) Inventors: Kazuya Tobita, Tokyo (JP); Youichi Kazuta, Tokyo (JP); Yuto Shiga, Tokyo (JP); Yuichi Takubo, Tokyo (JP); Junichiro Urabe, Tokyo (JP); Noriaki Hamachi, Tokyo (JP); Toshinori Matsuura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 843 days.

(21) Appl. No.: 17/706,146

(22) Filed: Mar. 28, 2022

(65) Prior Publication Data

US 2022/0319763 A1 Oct. 6, 2022

(30) Foreign Application Priority Data

Apr. 6, 2021 (JP) ................................ 2021-064696

(51) Int. Cl.

| | |
|---|---|
| ***H01F 5/00*** | (2006.01) |
| ***H01F 27/28*** | (2006.01) |
| ***H01F 27/29*** | (2006.01) |
| ***H01F 27/32*** | (2006.01) |
| ***H01F 41/04*** | (2006.01) |

(52) U.S. Cl.

CPC ......... *H01F 27/2804* (2013.01); *H01F 27/29* (2013.01); *H01F 27/323* (2013.01); *H01F 41/041* (2013.01); *H01F 2027/2809* (2013.01)

(58) Field of Classification Search

CPC .................................................. H01F 27/2804
USPC ................................................. 336/192, 200
See application file for complete search history.

(56) References Cited

U.S. PATENT DOCUMENTS

2013/0257576 A1* 10/2013 Arata .................. H01F 17/0013 336/200
2018/0182535 A1* 6/2018 Tachibana ........... H01F 17/0013
2019/0103209 A1 4/2019 Nagano et al.
2021/0272734 A1 9/2021 Nagano et al.

FOREIGN PATENT DOCUMENTS

JP 2002-260925 A 9/2002
JP 2003-17327 A 1/2003
JP 2019-016642 A 1/2019
JP 2019-67870 A 4/2019

* cited by examiner

*Primary Examiner* — Ronald Hinson
(74) *Attorney, Agent, or Firm* — Oliff PLC

(57) ABSTRACT

A multilayer coil component 1 includes an element body 2, a coil 5, a first terminal electrode 3, a second terminal electrode 4, a first connection conductor 6, and a second connection conductor 7. The coil 5 includes a first coil portion 8 that has one end of the coil 5 and is disposed on a side of a main surface 2*c* and a second coil portion 9 that has the other end of the coil 5 and is disposed on a side of the main surface 2*d*. A distance L2 between the first connection conductor 6 and the second coil portion 9 is larger than a distance L1 between the first connection conductor 6 and the first coil portion 8.

4 Claims, 16 Drawing Sheets

MULTILAYER COIL COMPONENT

TECHNICAL FIELD

The present invention relates to a multilayer coil component.

BACKGROUND

As a multilayer coil component of the related art, for example, the one described in Patent Document 1 (Japanese Unexamined Patent Publication No. 2019-16642) is known. The multilayer coil component described in Patent Document 1 includes a multilayer body in which a plurality of units are stacked. The units have a plurality of base material layers stacked and have a first main surface and a second main surface. In the units, a groove having a depth of at least one layer of the substrate layers is formed in the first main surface. In at least one unit, a hole leading to the second main surface is formed in a bottom of the groove. Each of the groove and the hole is filled with a conductor, and the plurality of units are stacked. As a result, the conductor with which the hole of one adjacent unit is filled and the conductor with which the groove of the other adjacent unit is filled are connected to each other, and inside the multilayer body, the conductors are connected to each other in a spiral shape with a stacking direction of the units as an axis.

SUMMARY

In the multilayer coil component, it is desirable to increase a diameter of a coil in order to improve characteristics. However, in a configuration in which a connection conductor is disposed inside an element body, when the diameter of the coil increases, a distance between the connection conductor and the coil decreases. As a result, stray capacitance (parasitic capacitance) formed by the coil and the connection conductor may increase. When the stray capacitance generated between the coil and the connection conductor increases, in the characteristics of the coil, a self-resonant frequency (SRF) decreases, and a quality factor (Q) value also decreases.

An object of an aspect of the present invention is to provide a multilayer coil component capable of suppressing generation of stray capacitance and improving characteristics.

A multilayer coil component according to an aspect of the present invention includes: an element body formed by stacking a plurality of insulator layers and having a pair of end surfaces facing each other, a pair of main surfaces facing each other, and a pair of side surfaces facing each other, one of the main surfaces being a mounting surface; a coil disposed in the element body and having a coil axis extending in a facing direction of the pair of main surfaces; a first terminal electrode and a second terminal electrode connected to the coil and disposed on the mounting surface; a first connection conductor disposed outside the coil in the element body when viewed in the facing direction, extending in the facing direction, and connecting one end of the coil located on a side of the other of the main surfaces and the first terminal electrode to each other; and a second connection conductor connecting the other end of the coil located on a side of the one of the main surfaces and the second terminal electrode, wherein the coil includes a first coil portion that has the one end of the coil and is disposed on a side of the other of the main surfaces and a second coil portion that has the other end of the coil and is disposed on a side of the one of the main surfaces, and wherein a shortest distance between the first connection conductor and the second coil portion is larger than a shortest distance between the first connection conductor and the first coil portion.

In the multilayer coil component, a potential difference between the first terminal electrode and the second terminal electrode reaches a maximum. When conductors with a large potential difference face each other, stray capacitance is formed. In the multilayer coil component, the first connection conductor connected to the first terminal electrode extends in the facing direction. In this configuration, stray capacitance is formed between the first connection conductor and the coil due to a potential difference between the first connection conductor and the coil. In particular, stray capacitance is likely to be formed between the coil connected to a side of the second terminal electrode and the first connection conductor. Incidentally, in the multilayer coil component, the shortest distance between the first connection conductor and the second coil portion is larger than the shortest distance between the first connection conductor and the first coil portion. As a result, in the multilayer coil component, the second coil portion with a large potential difference from the first connection conductor is disposed farther from the first connection conductor than the first coil portion. Therefore, in the multilayer coil component, stray capacitance formed between the first connection conductor and the second coil portion can be reduced. Further, in the multilayer coil component, the diameter of the first coil portion can be increased. Therefore, the inductance of the coil can be increased. As described above, in the multilayer coil component, it is possible to suppress the generation of stray capacitance and to increase the characteristics.

In the embodiment, a diameter of the first coil portion and a diameter of the second coil portion may be different, and a part of an outer edge of the first coil portion and a part of an outer edge of the second coil portion may overlap each other when viewed in the facing direction. In this configuration, since a part of an outer edge of the first coil portion and a part of an outer edge of the second coil portion overlap each other, the diameter of the second coil portion can be increased while ensuring the distance between the first connection conductor and the second coil portion.

In the embodiment, the first terminal electrode and the second coil portion may not overlap each other when viewed in the facing direction. In this configuration, it is possible to suppress the formation of stray capacitance between the first terminal electrode and the second coil portion.

In the embodiment, a distance between the first connection conductor and the coil may be set on the basis of a potential difference between the first connection conductor and the coil during use, and the distance may be longer at a position where the potential difference is large than at a position where the potential difference is smaller than at the position where the potential difference is large. In this configuration, since the distance is set according to the potential difference, the stray capacitance can be reduced.

According to the aspect of the present invention, it is possible to suppress generation of stray capacitance and improve characteristics.

DETAILED DESCRIPTION

Hereinafter, preferred embodiments of the present invention will be described in detail with reference to the accompanying drawings. In the description of the drawings, the same or equivalent elements are designated by the same reference signs, and duplicate description will be omitted.

First Embodiment

Figure 1:
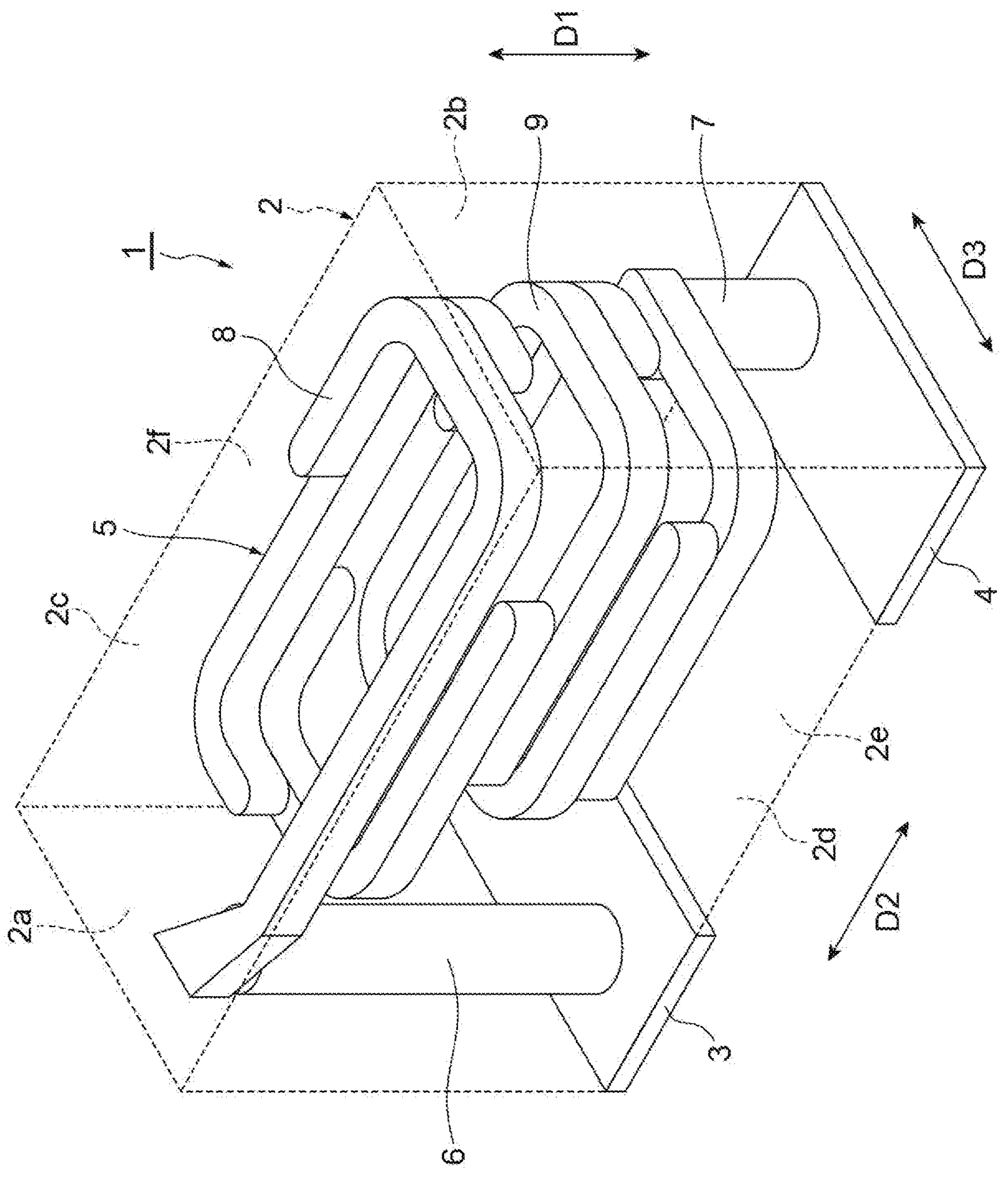
FIG. 1 is a perspective view of a multilayer coil component according to a first embodiment.
Figure 2:
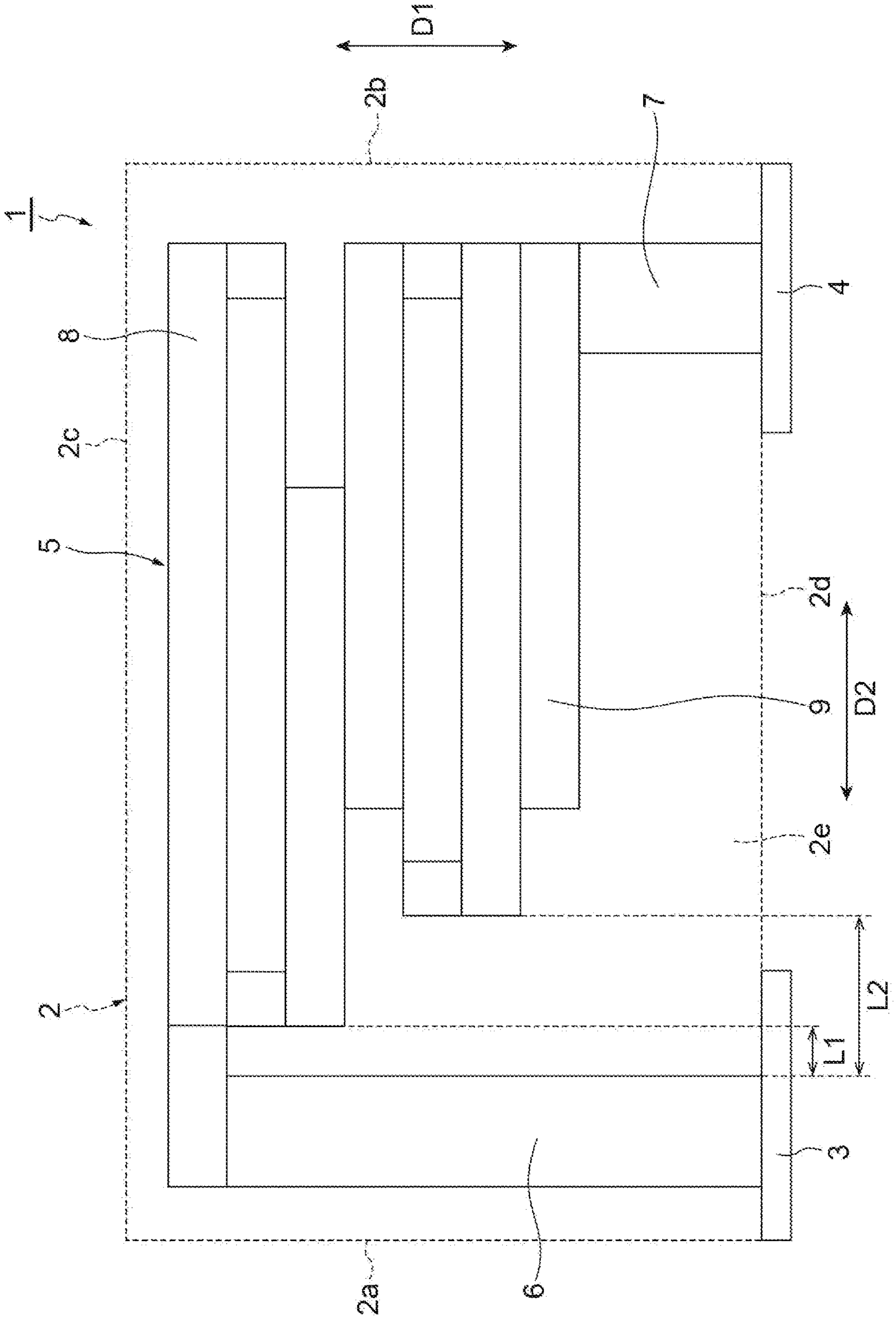
FIG. 2 is a side view of the multilayer coil component shown in FIG. 1.

A multilayer coil component according to a first embodiment will be described with reference to FIGS. 1 and 2. FIG. 1 is a perspective view of the multilayer coil component according to the first embodiment. FIG. 2 is a side view of the multilayer coil component shown in FIG. 1. As shown in FIGS. 1 and 2, a multilayer coil component 1 according to the first embodiment includes an element body 2, a first terminal electrode 3, a second terminal electrode 4, a coil 5, a first connection conductor 6, and a second connection conductor 7. In FIGS. 1 and 2, the element body 2 is shown by a broken line for convenience of explanation.

The element body 2 has a rectangular parallelepiped shape. The rectangular parallelepiped shape may be a shape of a rectangular parallelepiped in which corners and ridges are chamfered or a shape of a rectangular parallelepiped in which corners and ridges are rounded. The element body 2 has a pair of end surfaces 2*a* and 2*b*, a pair of main surfaces 2*c* and 2*d*, and a pair of side surfaces 2*e* and 2*f* as outer surfaces. The end surfaces 2*a* and 2*b* face each other. The main surfaces 2*c* and 2*d* face each other. The side surfaces 2*e* and 2*f* face each other. In the following, a facing direction of the main surfaces 2*c* and 2*d* is referred to as a first direction D1, a facing direction of the end surfaces 2*a* and 2*b* is referred to as a second direction D2, and a facing direction of the side surfaces 2*e* and 2*f* is referred to as a third direction D3. The first direction D1, the second direction D2, and the third direction D3 are substantially orthogonal to each other.

The end surfaces 2*a* and 2*b* extend in the first direction D1 to connect the main surfaces 2*c* and 2*d* to each other. The end surfaces 2*a* and 2*b* also extend in the third direction D3 to connect the side surfaces 2*e* and 2*f* to each other. The main surfaces 2*c* and 2*d* extend in the second direction D2 to connect the end surfaces 2*a* and 2*b* to each other. The main surfaces 2*c* and 2*d* also extend in the third direction D3 to connect the side surfaces 2*e* and 2*f* to each other. The side surfaces 2*e* and 2*f* extend in the first direction D1 to connect the main surfaces 2*c* and 2*d* to each other. The side surfaces 2*e* and 2*f* also extend in the second direction D2 to connect the end surfaces 2*a* and 2*b* to each other.

The main surface 2*d* (one of the main surfaces) is a mounting surface, for example, a surface which faces another electronic device (for example, a circuit base material or a multilayer electronic component), which is not shown, when the multilayer coil component 1 is mounted on the other electronic device. The end surfaces 2*a* and 2*b* are surfaces continuous from the mounting surface (that is, the main surface 2*d*).

The length of the element body 2 in the second direction D2 is longer than each of the length of the element body 2 in the first direction D1 and the length of the element body 2 in the third direction D3. The length of the element body 2 in the first direction D1 is longer than the length of the element body 2 in the third direction D3. That is, in the present embodiment, the end surfaces 2*a* and 2*b*, the main surfaces 2*c* and 2*d*, and the side surfaces 2*e* and 2*f* form a rectangular shape. The length of the element body 2 in the second direction D2 may be equivalent to each of the length of the element body 2 in the first direction D1 and the length of the element body 2 in the third direction D3, or may be shorter than each of these lengths.

In addition, in the present embodiment, "equivalent" may indicate a value including a slight difference or a manufacturing error in a preset range in addition to being equal. For example, under this definition, if a plurality of values are included within the range of ±5% of the average value of the plurality of values, the plurality of values are equivalent.

The element body 2 is formed by stacking a plurality of element body layers (insulator layers) 10*a* to 10*k* (see FIG. 3) in the first direction D1. That is, a stacking direction of the element body 2 is the first direction D1. A specific stacking configuration will be described later. In the actual element body 2, the plurality of element body layers 10*a* to 10*k* are integrated to the extent that a boundary between the layers cannot be visually recognized. The element body layers 10*a* to 10*k* are made of, for example, a magnetic material (a Ni—Cu—Zn based ferrite material, a Ni—Cu—Zn—Mg based ferrite material, a Ni—Cu based ferrite material, or the like). The magnetic material forming the element body layers 10*a* to 10*k* may contain an Fe alloy or the like. The element body layers 10*a* to 10*k* may be made of a nonmagnetic material (a glass ceramic material, a dielectric material, or the like).

Each of the first terminal electrode 3 and the second terminal electrode 4 is provided on the element body 2. The first terminal electrode 3 is constituted by a first terminal electrode layer 18*k* (see FIG. 3). The second terminal electrode 4 is constituted by a second terminal electrode layer 19*k* (see FIG. 3). Each of the first terminal electrode 3 and the second terminal electrode 4 is disposed on the main surface 2*d* of the element body 2. The first terminal electrode 3 and the second terminal electrode 4 are provided on the element body 2 apart from each other in the second direction D2. Specifically, the first terminal electrode 3 is disposed on a side of the end surface 2*a* of the element body 2. The second terminal electrode 4 is disposed on a side of the end surface 2*b* of the element body 2.

Each of the first terminal electrode 3 and the second terminal electrode 4 has a rectangular shape (a rectangular shape). Each of the first terminal electrode 3 and the second terminal electrode 4 is disposed such that a longitudinal direction thereof is the third direction D3 and a lateral direction thereof is the second direction D2. As shown in FIG. 2, the first terminal electrode 3 and the second terminal electrode 4 protrude from the main surface 2*d*. That is, in the present embodiment, a surface of each of the first terminal electrode 3 and the second terminal electrode 4 is not flush with the main surface 2*d*.

Each of the first terminal electrode 3 and the second terminal electrode 4 may be provided with a plated layer (not shown) containing, for example, Ni, Sn, Au, or the like by being subjected to electroplating or electroless plating. The plated layer may have, for example, a Ni plated film containing Ni and covering the first terminal electrode 3 and the second terminal electrode 4 and a Au plated film containing Au and covering the Ni plated film.

The coil 5 is disposed in the element body 2. The coil 5 is constituted by a plurality of coil conductor layers 12*b* to 12*h* (see FIG. 3). The plurality of coil conductor layers 12*b* to 12*h* are connected to each other to constitute the coil 5 in the element body 2. A coil axis of the coil 5 is provided in the first direction D1. The coil conductor layers 12*b* to 12*h* are disposed such that at least parts thereof overlap each other when viewed in the first direction D1. The plurality of coil conductor layers 12*b* to 12*h* are made of a conductive material (for example, Ag or Pd). The coil conductor layers 12*b* to 12*h* are disposed apart from the end surfaces 2*a* and 2*b*, the main surfaces 2*c* and 2*d*, and the side surfaces 2*e* and 2*f*.

The coil 5 includes a first coil portion 8 and a second coil portion 9. The first coil portion 8 is constituted by the plurality of coil conductor layers 12*b* to 12*d*. The first coil portion 8 is disposed on a side of the main surface 2*c* of the element body 2. The first coil portion 8 has one end of the coil 5 connected to the first connection conductor 6. The first coil portion 8 is connected to the first connection conductor 6. The second coil portion 9 is constituted by the plurality of coil conductor layers 12*e* to 12*h*. The second coil portion 9 is disposed on a side of the main surface 2*d* of the element body 2. The second coil portion 9 has the other end of the coil 5 connected to the second connection conductor 7. The second coil portion 9 is connected to the second connection conductor 7.

The first connection conductor 6 is disposed in the element body 2. The first connection conductor 6 connects the first terminal electrode 3 and the coil 5 to each other. The first connection conductor 6 is a through hole conductor. The first connection conductor 6 extends in the first direction D1 and is connected to the first terminal electrode 3 and the one end of the coil 5. Specifically, an end portion of the first connection conductor 6 on a side of the main surface 2*c* (the other of the main surfaces) in the first direction D1 is connected to the one end of the coil 5 located on a side of the main surface 2*c*. The first connection conductor 6 is constituted by a plurality of first connection conductor layers 14*c* to 14*j* (see FIG. 3). The first connection conductor 6 is disposed outside the coil 5 when viewed in the first direction D1. Specifically, the first connection conductor 6 is disposed at a corner when viewed in the first direction D1. More specifically, the first connection conductor 6 is disposed at a corner formed by the end surface 2*a* and the side surface 2*e*. In the first connection conductor 6, a cross section orthogonal to an extending direction (the first direction D1) (a cross section in the second direction D2 and the third direction D3) has a round shape. That is, the first connection conductor 6 has the shape of a circular column. Round shapes include, for example, a perfect circle, an ellipse, and the like.

The second connection conductor 7 is disposed in the element body 2. The second connection conductor 7 connects the second terminal electrode 4 and the coil 5 to each other. The second connection conductor 7 is a through hole conductor. The second connection conductor 7 extends in the first direction D1 and is connected to the second terminal electrode 4 and the other end of the coil 5. Specifically, an end portion of the second connection conductor 7 on a side of the main surface 2*c* in the first direction D1 is connected to the other end of the coil 5 located on a side of the main surface 2*d*. The second connection conductor 7 is constituted by a plurality of second connection conductor layers 16*i* and 16*j* (see FIG. 3). The second connection conductor 7 is disposed at a corner when viewed in the first direction D1. More specifically, the second connection conductor 7 is disposed at a corner formed by the end surface 2*b* and the side surface 2*f*. That is, the second connection conductor 7 is disposed diagonally with the first connection conductor 6. In the second connection conductor 7, a cross section orthogonal to an extending direction (the first direction D1) (a cross section in the second direction D2 and the third direction D3) has a round shape. That is, the second connection conductor 7 has the shape of a circular column.

Figure 3:
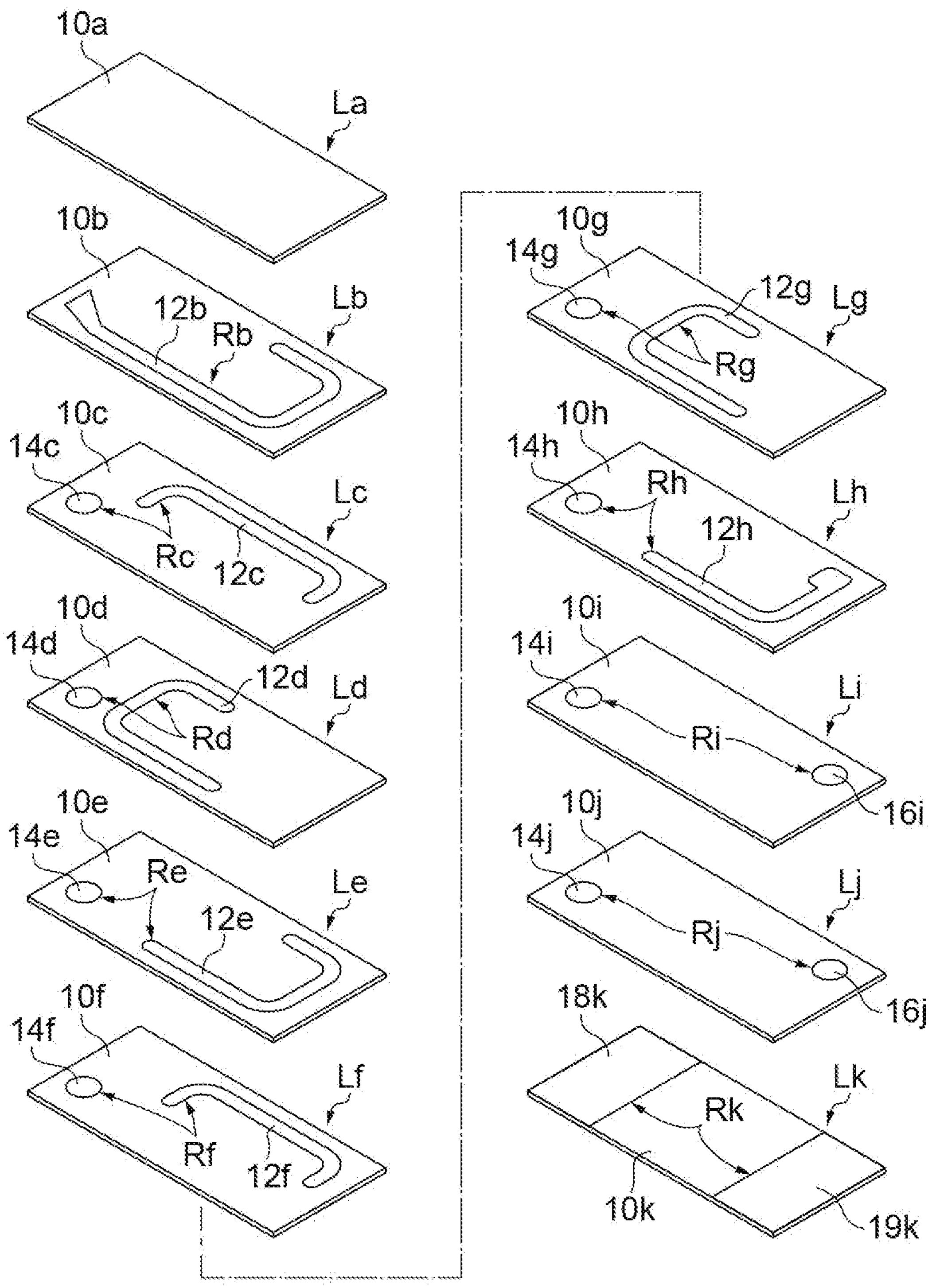
FIG. 3 is an exploded perspective view of the multilayer coil component shown in FIG. 1.

FIG. 3 is an exploded perspective view of the multilayer coil component shown in FIG. 1. As shown in FIG. 3, the multilayer coil component 1 includes a plurality of layers La, Lb, Lc, Ld, Le, Lf, Lg, Lh, Li, Lj, and Lk. The multilayer coil component 1 is constituted by the layers La to Lk being stacked in order from a side of the main surface 2*c*, for example.

The layer La is constituted by the element body layer 10*a*.

The layer Lb is formed by combining the element body layer 10*b* and the coil conductor layer 12*b* with each other. The element body layer 10*b* is provided with a defective portion Rb which has a shape corresponding to the coil conductor layer 12*b* and into which the coil conductor layer 12*b* is fitted. The element body layer 10*b* and the coil conductor layer 12*b* have a complementary relationship with each other.

The layer Lc is formed by combining the element body layer 10*c*, the coil conductor layer 12*c*, and the first connection conductor layer 14*c* with each other. The element body layer 10*c* is provided with a defective portion Rc which has a shape corresponding to the coil conductor layer 12*c* and the first connection conductor layer 14*c* and into which the coil conductor layer 12*c* and the first connection conductor layer 14*c* are fitted. The element body layer 10*c* and the entirety of the coil conductor layer 12*c* and the first connection conductor layer 14*c* have a complementary relationship with each other.

The layer Ld is formed by combining the element body layer 10*d*, the coil conductor layer 12*d*, and the first connection conductor layer 14*d* with each other. The element body layer 10*d* is provided with a defective portion Rd which has a shape corresponding to the coil conductor layer 12*d* and the first connection conductor layer 14*d* and into which the coil conductor layer 12*d* and the first connection conductor layer 14*d* are fitted. The element body layer 10*d* and the entirety of the coil conductor layer 12*d* and the first connection conductor layer 14*d* have a complementary relationship with each other.

The layer Le is formed by combining the element body layer 10*e*, the coil conductor layer 12*e*, and the first connection conductor layer 14*e* with each other. The element body layer 10*e* is provided with a defective portion Re which has a shape corresponding to the coil conductor layer 12*e* and the first connection conductor layer 14*e* and into which the coil conductor layer 12*e* and the first connection conductor layer 14*e* are fitted. The element body layer 10*e* and the entirety of the coil conductor layer 12*e* and the first connection conductor layer 14*e* have a complementary relationship with each other.

The layer Lf is formed by combining the element body layer 10*f*, the coil conductor layer 12*f*, and the first connection conductor layer 14*f* with each other. The element body layer 10*f* is provided with a defective portion Rf which has a shape corresponding to the coil conductor layer 12*f* and the first connection conductor layer 14*f* and into which the coil conductor layer 12*f* and the first connection conductor layer 14*f* are fitted. The element body layer 10*f* and the entirety of the coil conductor layer 12*f* and the first connection conductor layer 14*f* have a complementary relationship with each other.

The layer Lg is formed by combining the element body layer 10*g*, the coil conductor layer 12*g*, and the first connection conductor layer 14*g* with each other. The element body layer 10*g* is provided with a defective portion Rg which has a shape corresponding to the coil conductor layer 12*g* and the first connection conductor layer 14*g* and into which the coil conductor layer 12*g* and the first connection conductor layer 14*g* are fitted. The element body layer 10*g* and the entirety of the coil conductor layer 12*g* and the first connection conductor layer 14*g* have a complementary relationship with each other.

The layer Lh is formed by combining the element body layer 10*h*, the coil conductor layer 12*h*, and the first connection conductor layer 14*h* with each other. The element body layer 10*h* is provided with a defective portion Rh which has a shape corresponding to the coil conductor layer 12*h* and the first connection conductor layer 14*h* and into which the coil conductor layer 12*h* and the first connection conductor layer 14*h* are fitted. The element body layer 10*h* and the entirety of the coil conductor layer 12*h* and the first connection conductor layer 14*h* have a complementary relationship with each other.

The layer Li is formed by combining the element body layer 10*i*, the first connection conductor layer 14*i*, and the second connection conductor layer 16*i* with each other. The element body layer 10*i* is provided with a defective portion Ri which has a shape corresponding to the first connection conductor layer 14*i* and the second connection conductor layer 16*i* and into which the first connection conductor layer 14*i* and the second connection conductor layer 16*i* are fitted. The element body layer 10*i* and the entirety of the first connection conductor layer 14*i* and the second connection conductor layer 16*i* have a complementary relationship with each other.

The layer Lj is formed by combining the element body layer 10*j*, the first connection conductor layer 14*j*, and the second connection conductor layer 16*j* with each other. The element body layer 10*j* is provided with a defective portion Rj which has a shape corresponding to the first connection conductor layer 14*j* and the second connection conductor layer 16*j* and into which the first connection conductor layer 14*j* and the second connection conductor layer 16*j* are fitted. The element body layer 10*j* and the entirety of the first connection conductor layer 14*j* and the second connection conductor layer 16*j* have a complementary relationship with each other.

The layer Lk is formed by combining the element body layer 10*k*, the first terminal electrode layer 18*k*, and the second terminal electrode layer 19*k* with each other. The element body layer 10*k* is provided with a defective portion Rk which has a shape corresponding to the first terminal electrode layer 18*k* and the second terminal electrode layer 19*k* and into which the first terminal electrode layer 18*k* and the second terminal electrode layer 19*k* are fitted. The element body layer 10*k* and the entirety of the first terminal electrode layer 18*k* and the second terminal electrode layer 19*k* have a complementary relationship with each other.

The width of each of the defective portions Rb to Rk (hereinafter referred to as the width of the defective portion) is basically set to be wider than the width of each of the coil conductor layers 12*b* to 12*h*, the first connection conductor layers 14*c* to 14*j*, the second connection conductor layers 16*i* and 16*j*, and the first and second terminal electrode layers 18*k* and 19*k* (hereinafter referred to as the width of a conductor portion). In order to improve adhesion between the element body layers 10*b* to 10*k* and the coil conductor layers 12*b* to 12*h*, the first connection conductor layers 14*c* to 14*j*, the second connection conductor layers 16*i* and 16*j*, and the first and second terminal electrode layers 18*k* and 19*k*, the width of the defective portion may be intentionally set to be narrower than the width of the conductor portion. A value obtained by subtracting the width of the conductor portion from the width of the defective portion is preferably −3 μm or more and 10 μm or less and more preferably 0 μm or more and 10 μm or less, for example.

As shown in FIG. 2, in the multilayer coil component 1, a distance L2 between the first connection conductor 6 and the second coil portion 9 is larger than a distance L1 between the first connection conductor 6 and the first coil portion 8 (L2>L1). In other words, the distance L1 between the first connection conductor 6 and the first coil portion 8 is smaller than the distance L2 between the first connection conductor 6 and the second coil portion 9 (L1<L2). That is, the second coil portion 9 is disposed farther from the first connection conductor 6 than the first coil portion 8. The distance L1 is the shortest distance between the first connection conductor 6 and the first coil portion 8 (the coil conductor layers 12*b* to 12*d*). The distance L2 is the shortest distance between the first connection conductor 6 and the second coil portion 9 (the coil conductor layers 12*e* to 12*h*). In FIG. 2, the distance L1 and the distance L2 are shown as an example for convenience and may differ from the actual shortest distance.

A diameter of the first coil portion 8 and a diameter of the second coil portion 9 are different. The diameter of the first coil portion 8 is larger than the diameter of the second coil portion 9. In other words, the diameter of the second coil portion 9 is smaller than the diameter of the first coil portion 8. A coil axis of the first coil portion 8 and a coil axis of the second coil portion 9 do not coincide with each other. The coil axis of the second coil portion 9 is located closer to the end surface 2*b* than the coil axis of the first coil portion 8. An edge of the first coil portion 8 and an edge of the second coil portion 9 on a side of the end surface 2*b* of the element body 2 coincide with each other in the first direction D1. Specifically, when viewed in the first direction D1, a part of the coil conductor layer 12*b* constituting the first coil portion 8 and parts of the coil conductor layer 12*e* and the coil conductor layer 12*h* constituting the second coil portion 9 overlap each other.

The second coil portion 9 does not overlap the first terminal electrode 3 when viewed in the first direction D1. That is, the second coil portion 9 is not located above the first terminal electrode 3. Specifically, the coil conductor layers 12*e* to 12*h* do not overlap the first terminal electrode 3 when viewed in the first direction D1.

An example of a manufacturing method of the multilayer coil component 1 according to the embodiment will be described.

First, an element body forming layer is formed by applying an element body paste containing the above-mentioned constituent material of the element body layers 10*a* to 10*k* and a photosensitive material onto a base material (for example, a PET film). The photosensitive material contained in the element body paste may be either a negative type or a positive type, and a known material can be used as the photosensitive material. Subsequently, for example, the element body forming layer is exposed and developed by a photolithography method using a Cr mask, and thus an element body pattern from which a shape corresponding to a shape of a conductor forming layer, which will be described later, is removed is formed on the base material. The element body pattern is a layer to be each of the element body layers 10*a* to 10*k* after heat treatment. That is, the element body pattern in which a defective portion to be each of the defect portions Rb to Rk is provided is formed. The "photolithography method" of the present embodiment only have to be any one in which a layer containing the photosensitive material to be processed is processed into a desired pattern by being exposed and developed and is not limited to the type of mask or the like.

On the other hand, a conductor forming layer is formed by applying a conductor paste containing the above-mentioned constituent material of the coil conductor layers 12*b* to 12*h*, the first connection conductor layers 14*c* to 14*j*, the second connection conductor layers 16*i* and 16*j*, and the first and second terminal electrode layers 18*k* and 19*k* and a photosensitive material onto a base material (for example, a PET film). The photosensitive material contained in the conductor paste may be either a negative type or a positive type, and a known material can be used as the photosensitive material. Subsequently, for example, the conductor forming layer is exposed and developed by a photolithography method using a Cr mask, and thus a conductor pattern is formed on the base material. The conductor pattern is a layer to be each of the coil conductor layers 12*b* to 12*h*, the first connection conductor layers 14*c* to 14*j*, the second connection conductor layers 16*i* and 16*j*, and the first and the second terminal electrode layers 18*k* and 19*k* after heat treatment.

Subsequently, the element body forming layer is transferred from the base material onto a support. The element body forming layer is a layer to be the layer La after heat treatment.

Subsequently, the conductor pattern and the element body pattern are repeatedly transferred onto a support, and thus the conductor pattern and the element body pattern are stacked in the third direction D3. Specifically, first, the conductor pattern is transferred from the base material onto the element body forming layer. Next, the element body pattern is transferred from the base material onto the element body forming layer. The conductor pattern is combined with the defective portion of the element body pattern, and the element body pattern and the conductor pattern become the same layer on the element body forming layer. Further, a transfer step of the conductor pattern and the element body pattern is repeatedly carried out, and thus the conductor pattern and the element body pattern are stacked in a state of being combined with each other. As a result, layers to be the layers Lb to Lk after heat treatment are stacked.

Subsequently, the element body forming layer is transferred from the base material onto the layers stacked in the transfer step of the conductor pattern and the element body pattern. The element body forming layer is a layer to be the layer La after heat treatment.

As described above, a multilayer body that constitutes the multilayer coil component 1 after heat treatment is formed on the support. Subsequently, the obtained multilayer body is cut into a predetermined size. After that, the cut multilayer body is subjected to binder removal treatment and then heat treatment. A heat treatment temperature is, for example, about 850° C. to 900° C. If necessary, after heat treatment, the first terminal electrode 3 and the second terminal electrode 4 may be provided with a plated layer by being subjected to electroplating or electroless plating.

In the multilayer coil component 1, a potential difference between the first terminal electrode 3 and the second terminal electrode 4 reaches a maximum. When conductors with a large potential difference face each other, stray capacitance is formed. In the multilayer coil component 1, the first connection conductor 6 connected to the first terminal electrode 3 extends in the first direction D1. In this configuration, stray capacitance is formed between the first connection conductor 6 and the coil 5 due to a potential difference between the first connection conductor 6 and the coil 5. In particular, stray capacitance is likely to be formed between the coil 5 connected to a side of the second terminal electrode 4 and the first connection conductor 6. Incidentally, in the multilayer coil component 1, the distance L2 between the first connection conductor 6 and the second coil portion 9 is larger than the distance L1 between the first connection conductor 6 and the first coil portion 8. As a result, in the multilayer coil component 1, the second coil portion 9 with a large potential difference from the first connection conductor 6 is disposed farther from the first connection conductor 6 than the first coil portion 8. Therefore, in the multilayer coil component 1, stray capacitance formed between the first connection conductor 6 and the second coil portion 9 can be reduced. Further, in the multilayer coil component 1, the diameter of the first coil portion 8 can be increased. Therefore, the inductance of the coil 5 can be increased. As described above, in the multilayer coil component 1, it is possible to suppress the generation of stray capacitance and to increase the characteristics.

In the multilayer coil component 1 of the present embodiment, an outer edge of the first coil portion 8 and an outer edge of the second coil portion 9 on a side of the end surface 2*b* of the element body 2 coincide with each other in the first direction D1. In this configuration, the diameter of the second coil portion 9 can be increased while ensuring the distance between the first connection conductor 6 and the second coil portion 9.

In the multilayer coil component 1 according to the present embodiment, the first terminal electrode 3 and the second coil portion 9 do not overlap each other when viewed in the first direction D1. In this configuration, it is possible to suppress the formation of stray capacitance between the first terminal electrode 3 and the second coil portion 9.

Second Embodiment

Figure 4:
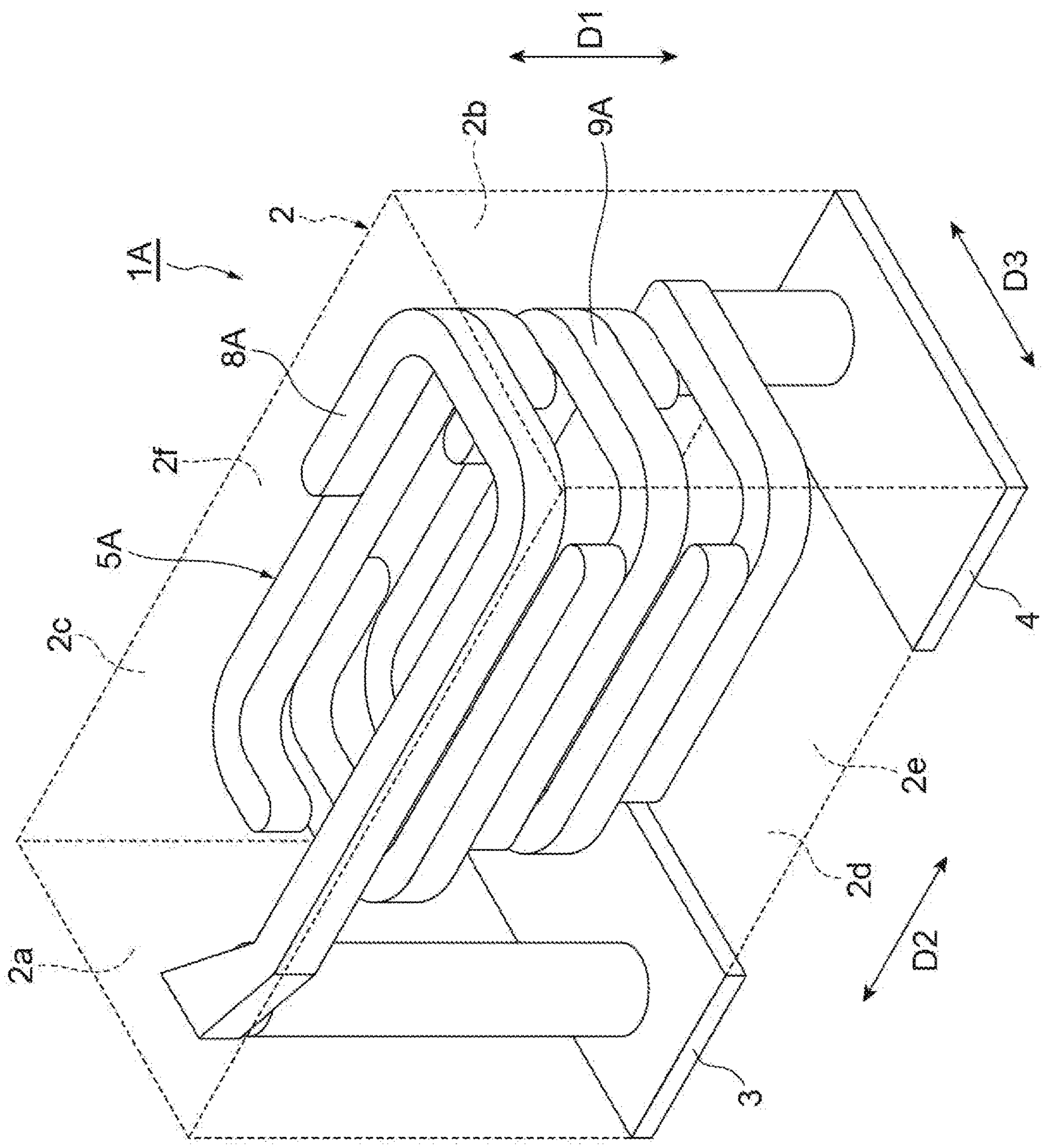
FIG. 4 is a perspective view of a multilayer coil component according to a second embodiment.

Subsequently, a multilayer coil component according to a second embodiment will be described with reference to FIGS. 4 and 5. FIG. 4 is a perspective view of the multilayer coil component according to the second embodiment. FIG.

5 is a side view of the multilayer coil component shown in FIG. 4. As shown in FIGS. 4 and 5, a multilayer coil component 1A according to the second embodiment includes an element body 2, a first terminal electrode 3, a second terminal electrode 4, a coil 5A, a first connection conductor 6, and a second connection conductor 7. In FIGS. 4 and 5, the element body 2 is shown by a broken line for convenience of explanation.

The element body 2 is formed by stacking a plurality of element body layers 20*a* to 20*k* (see FIG. 6) in the first direction D1.

The coil 5A is disposed in the element body 2. The coil 5A is constituted by a plurality of coil conductor layers 22*b* to 22*h* (see FIG. 6). The plurality of coil conductor layers 22*b* to 22*h* are connected to each other to constitute the coil 5A in the element body 2. A coil axis of the coil 5A is provided in the first direction D1. The coil conductor layers 22*b* to 22*h* are disposed such that at least parts thereof overlap each other when viewed in the first direction D1. The plurality of coil conductor layers 22*b* to 22*h* are made of a conductive material (for example, Ag or Pd). The coil conductor layers 22*b* to 22*h* are disposed apart from the end surfaces 2*a* and 2*b*, the main surfaces 2*c* and 2*d*, and the side surfaces 2*e* and 2*f*.

The coil 5A includes a first coil portion 8A and a second coil portion 9A. The first coil portion 8A is constituted by the plurality of coil conductor layers 22*b* to 22*d*. The first coil portion 8A is disposed on a side of the main surface 2*c* of the element body 2. The first coil portion 8A has one end of the coil 5A connected to the first connection conductor 6. The first coil portion 8A is connected to the first connection conductor 6. The second coil portion 9A is constituted by the plurality of coil conductor layers 22*e* to 22*h*. The second coil portion 9A is disposed on a side of the main surface 2*d* of the element body 2. The second coil portion 9A has the other end of the coil 5A connected to the second connection conductor 7. The second coil portion 9A is connected to the second connection conductor 7.

Figure 6:
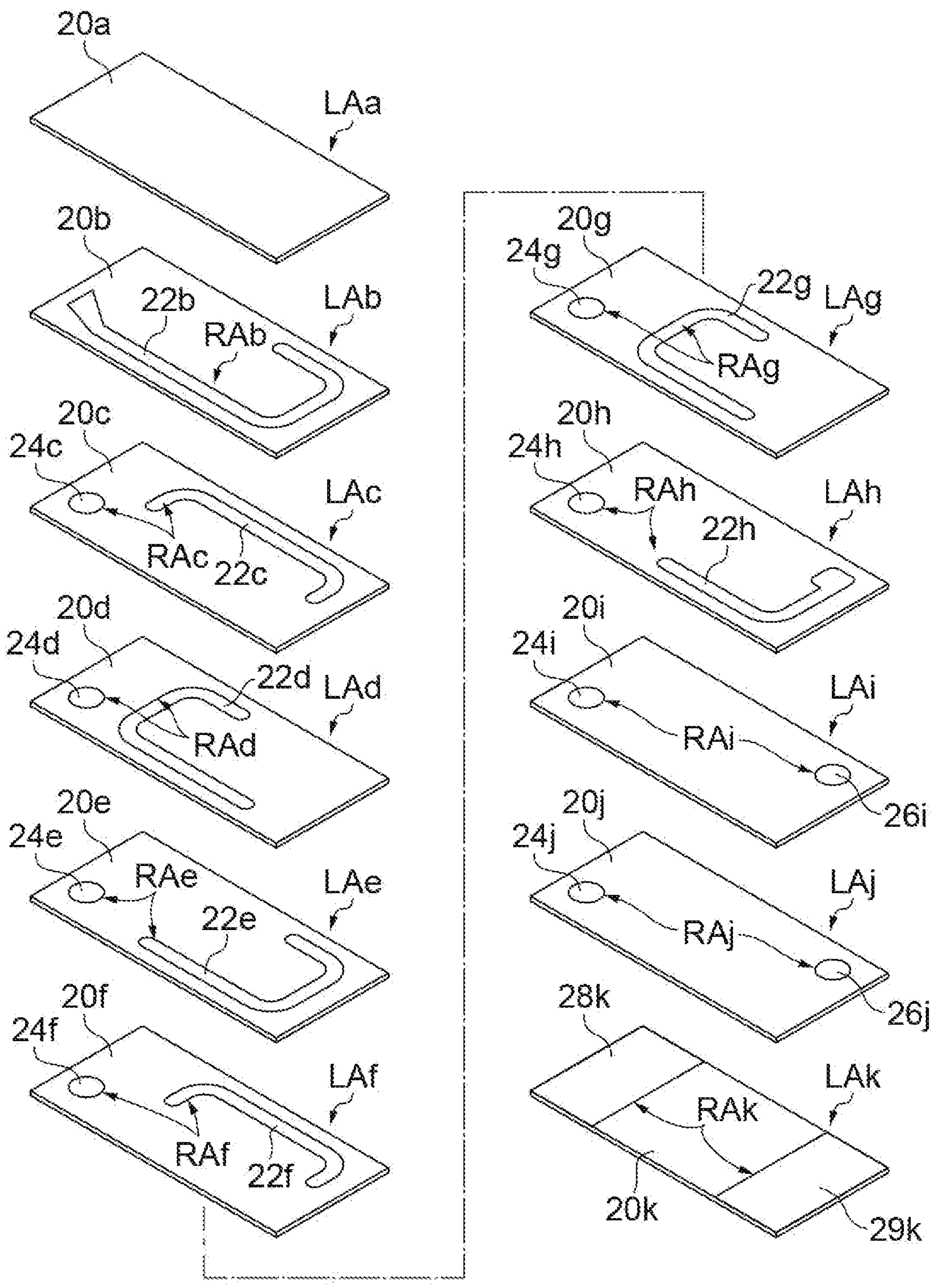
FIG. 6 is an exploded perspective view of the multilayer coil component shown in FIG. 4.

FIG. 6 is an exploded perspective view of the multilayer coil component. As shown in FIG. 6, the multilayer coil component 1A includes a plurality of layers LAa, LAb, LAc, LAd, LAe, LAf, LAg, LAh, LAi, LAj, and LAk. The multilayer coil component 1A is constituted by the layers LAa to LAk being stacked in order from a side of the main surface 2*c*, for example.

The layer LAa is constituted by the element body layer 20*a*.

The layer LAb is formed by combining the element body layer 20*b* and the coil conductor layer 22*b* with each other. The element body layer 20*b* is provided with a defective portion RAb. The layer LAc is formed by combining the element body layer 20*c*, the coil conductor layer 22*c*, and a first connection conductor layer 24*c* with each other. The element body layer 20*c* is provided with a defective portion RAc.

The layer LAd is formed by combining the element body layer 20*d*, the coil conductor layer 22*d*, and a first connection conductor layer 24*d* with each other. The element body layer 20*d* is provided with a defective portion RAd. The layer LAe is formed by combining the element body layer 20*e*, the coil conductor layer 22*e*, and a first connection conductor layer 24*e* with each other. The element body layer 20*e* is provided with a defective portion RAe.

The layer LAf is formed by combining the element body layer 20*f*, the coil conductor layer 22*f*, and a first connection conductor layer 24*f* with each other. The element body layer 20*f* is provided with a defective portion RAf. The layer LAg is formed by combining the element body layer 20*g*, the coil conductor layer 22*g*, and a first connection conductor layer 24*g* with each other. The element body layer 20*g* is provided with a defective portion RAg.

The layer LAh is formed by combining the element body layer 20*h*, the coil conductor layer 22*h*, and a first connection conductor layer 24*h* with each other. The element body layer 20*h* is provided with a defective portion RAh. The layer LAi is formed by combining the element body layer 20*i*, a first connection conductor layer 24*i*, and a second connection conductor layer 26*i* with each other. The element body layer 20*i* is provided with a defective portion RAi.

The layer LAj is formed by combining the element body layer 20*j*, a first connection conductor layer 24*j*, and a second connection conductor layer 26*j* with each other. The element body layer 20*j* is provided with a defective portion RAj. The layer LAk is formed by combining the element body layer 20*k*, a first terminal electrode layer 28*k*, and a second terminal electrode layer 29*k* with each other. The element body layer 20*k* is provided with a defective portion RAk.

Figure 5:
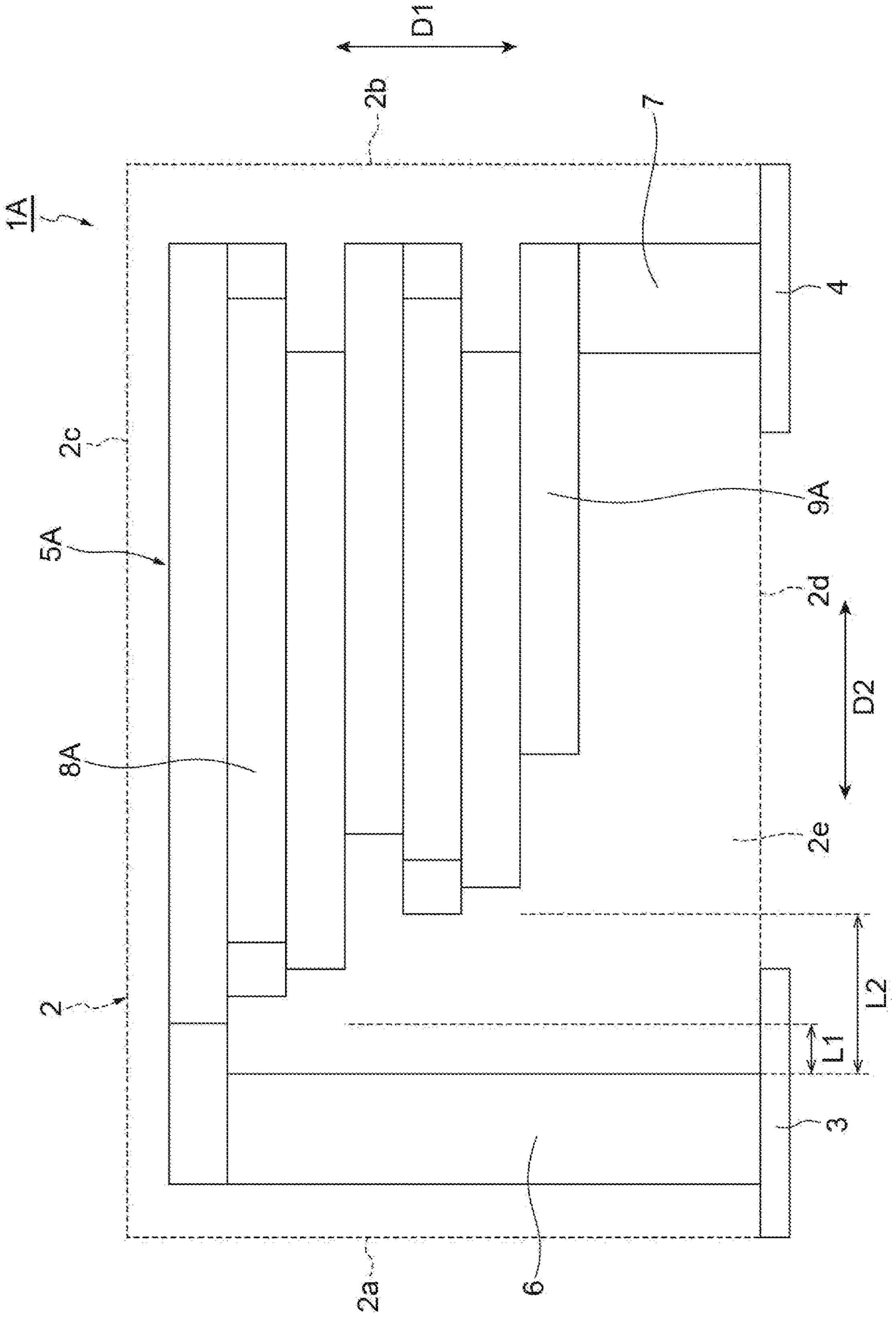
FIG. 5 is a side view of the multilayer coil component shown in FIG. 4.

As shown in FIG. 5, in the multilayer coil component 1A, a distance L2 between the first connection conductor 6 and the second coil portion 9A is larger than a distance L1 between the first connection conductor 6 and the first coil portion 8A. In other words, the distance L1 between the first connection conductor 6 and the first coil portion 8A is smaller than the distance L2 between the first connection conductor 6 and the second coil portion 9A. That is, the second coil portion 9A is disposed farther from the first connection conductor 6 than the first coil portion 8A. The distance L1 is the shortest distance between the first connection conductor 6 and the first coil portion 8A (the coil conductor layers 22*b* to 22*d*). The distance L2 is the shortest distance between the first connection conductor 6 and the second coil portion 9A (the coil conductor layers 22*e* to 22*h*). In FIG. 5, the distance L1 and the distance L2 are shown as an example for convenience and may differ from the actual shortest distance.

In the first coil portion 8A, a distance between the first connection conductor 6 and the coil conductor layer 22*d* is than a distance between the first connection conductor 6 and the coil conductor layer 22*c*. That is, in a path of the first terminal electrode 3, the first connection conductor 6, the coil 5A, the second connection conductor 7, and the second terminal electrode 4, the coil conductor layer 22*d* closer to the second terminal electrode 4 is disposed farther from the first connection conductor 6 than the coil conductor layer 22*c*. In the second coil portion 9A, a distance between the first connection conductor 6 and the coil conductor layer 22*g* is larger than a distance between the first connection conductor 6 and the coil conductor layer 22*f*. That is, in the above path, the coil conductor layer 22*g* closer to the second terminal electrode 4 is disposed farther from the first connection conductor 6 than the coil conductor layer 22*f*.

In the multilayer coil component 1A, the distances between the first connection conductor 6 and the coil conductor layers 22*c* and 22*d* of the first coil portion 8A are set on the basis of a potential difference generated when the multilayer coil component 1A is used. Specifically, in the multilayer coil component 1A, the distances between the first connection conductor 6 and the coil conductor layers 22*c* and 22*d* are set such that the larger a potential difference between the coil conductor layer and the first connection conductor 6, the larger a distance between the coil conductor layer and the first connection conductor 6. A potential difference between the first connection conductor 6 and the coil conductor layer 22*d* is larger than a potential difference between the first connection conductor 6 and the coil conductor layer 22*c*. As a result, in the multilayer coil component 1A, in the first coil portion 8A, the distance between the first connection conductor 6 and the coil conductor layer becomes larger in the order of the distance between the first connection conductor 6 and the coil conductor layer 22*c* and the distance between the first connection conductor 6 and the coil conductor layer 22*d*. Similarly, in the multilayer coil component 1A, in the second coil portion 9A, the distance between the first connection conductor 6 and the coil conductor layer becomes larger in the order of the distance between the first connection conductor 6 and the coil conductor layer 22*f* and the distance between the first connection conductor 6 and the coil conductor layer 22*g*.

A diameter of the first coil portion 8A and a diameter of the second coil portion 9A are different. The diameter of the first coil portion 8A is larger than the diameter of the second coil portion 9A. In other words, the diameter of the second coil portion 9A is smaller than the diameter of the first coil portion 8A. A coil axis of the first coil portion 8A and a coil axis of the second coil portion 9A do not coincide with each other. The coil axis of the second coil portion 9A is located closer to the end surface 2*b* than the coil axis of the first coil portion 8A. An edge of the first coil portion 8A and an edge of the second coil portion 9A on a side of the end surface 2*b* of the element body 2 coincide with each other in the first direction D1. Specifically, when viewed in the first direction D1, a part of the coil conductor layer 22*b* constituting the first coil portion 8A and parts of the coil conductor layer 22*e* and the coil conductor layer 22*h* constituting the second coil portion 9A overlap each other.

The second coil portion 9A does not overlap the first terminal electrode 3 when viewed in the first direction D1. That is, the second coil portion 9A is not located above the first terminal electrode 3. Specifically, the coil conductor layers 22*e* to 22*h* do not overlap the first terminal electrode 3 when viewed in the first direction D1.

As described above, in the multilayer coil component 1A according to the present embodiment, similarly to the multilayer coil component 1, the distance L2 between the first connection conductor 6 and the second coil portion 9A is larger than the distance L1 between the first connection conductor 6 and the first coil portion 8A. As a result, in the multilayer coil component 1A, the second coil portion 9A with a large potential difference from the first connection conductor 6 is disposed farther from the first connection conductor 6 than the first coil portion 8A. Therefore, in the multilayer coil component 1A, stray capacitance formed between the first connection conductor 6 and the second coil portion 9A can be reduced. Further, in the multilayer coil component 1A, the diameter of the first coil portion 8A can be increased. Therefore, the inductance of the coil 5A can be increased. As described above, in the multilayer coil component 1A, it is possible to suppress the generation of stray capacitance and to increase the characteristics.

In the multilayer coil component 1A according to the present embodiment, the distances between the first connection conductor 6 and the coil conductor layers 22*c* and 22*d* of the first coil portion 8A and the distances between the first connection conductor 6 and the coil conductor layers 22*f* and 22*g* of the second coil portion 9A are set on the basis of a potential difference generated when the multilayer coil component 1A is used. The potential difference between the first connection conductor 6 and the coil conductor layer 22*d* is larger than the potential difference between the first connection conductor 6 and the coil conductor layer 22*c*. Therefore, in the first coil portion 8A, the distance between the first connection conductor 6 and the coil conductor layer 22*d* is larger than the distance between the first connection conductor 6 and the coil conductor layer 22*c*. Further, the potential difference between the first connection conductor 6 and the coil conductor layer 22*g* is larger than the potential difference between the first connection conductor 6 and the coil conductor layer 22*h*. Therefore, in the second coil portion 9A, the distance between the first connection conductor 6 and the coil conductor layer 22*g* is larger than the distance between the first connection conductor 6 and the coil conductor layer 22*f*. In this configuration, since the distance is set according to the potential difference, the stray capacitance can be reduced.

Third Embodiment

Figure 7:
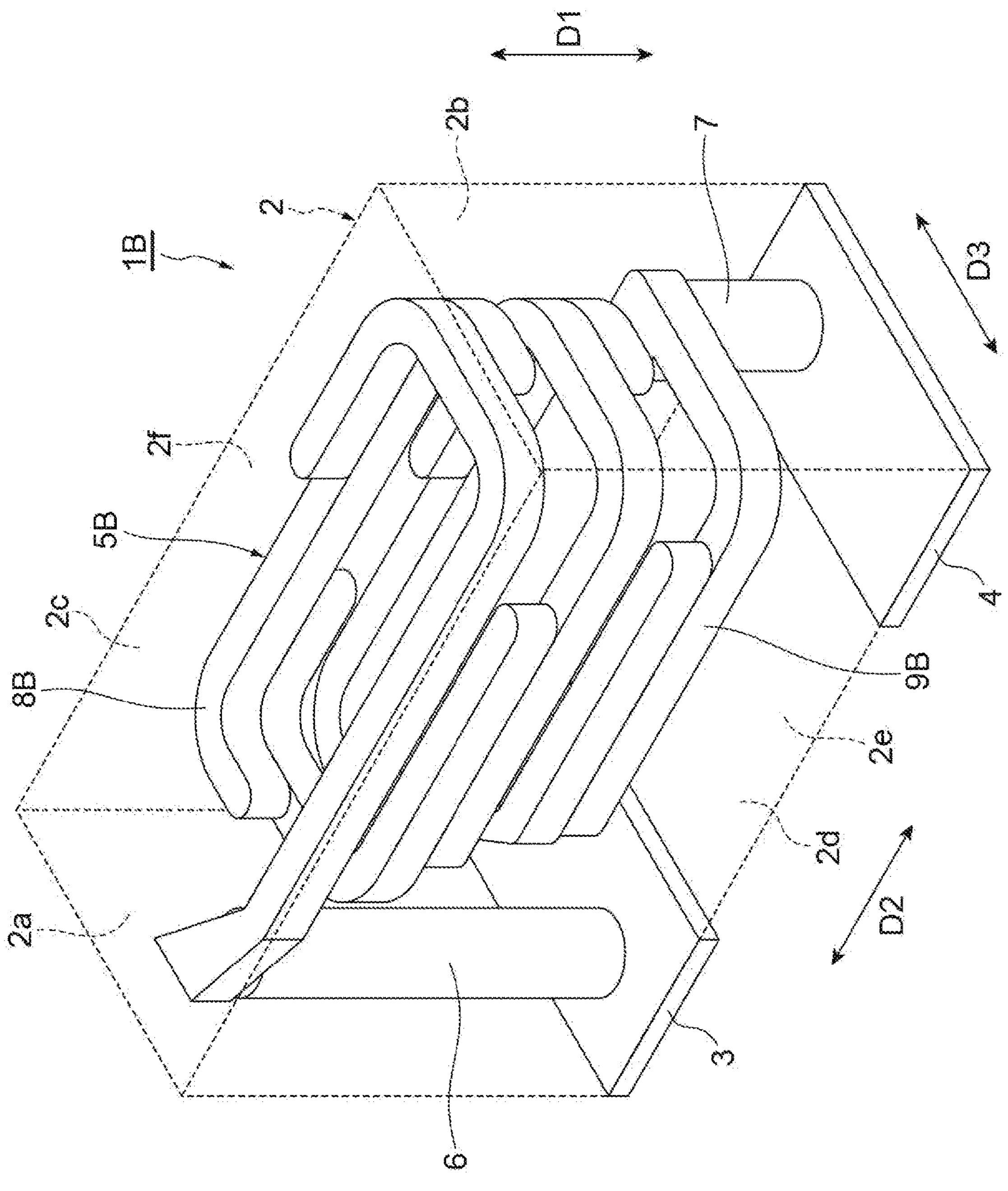
FIG. 7 is a perspective view of a multilayer coil component according to a third embodiment.
Figure 8:
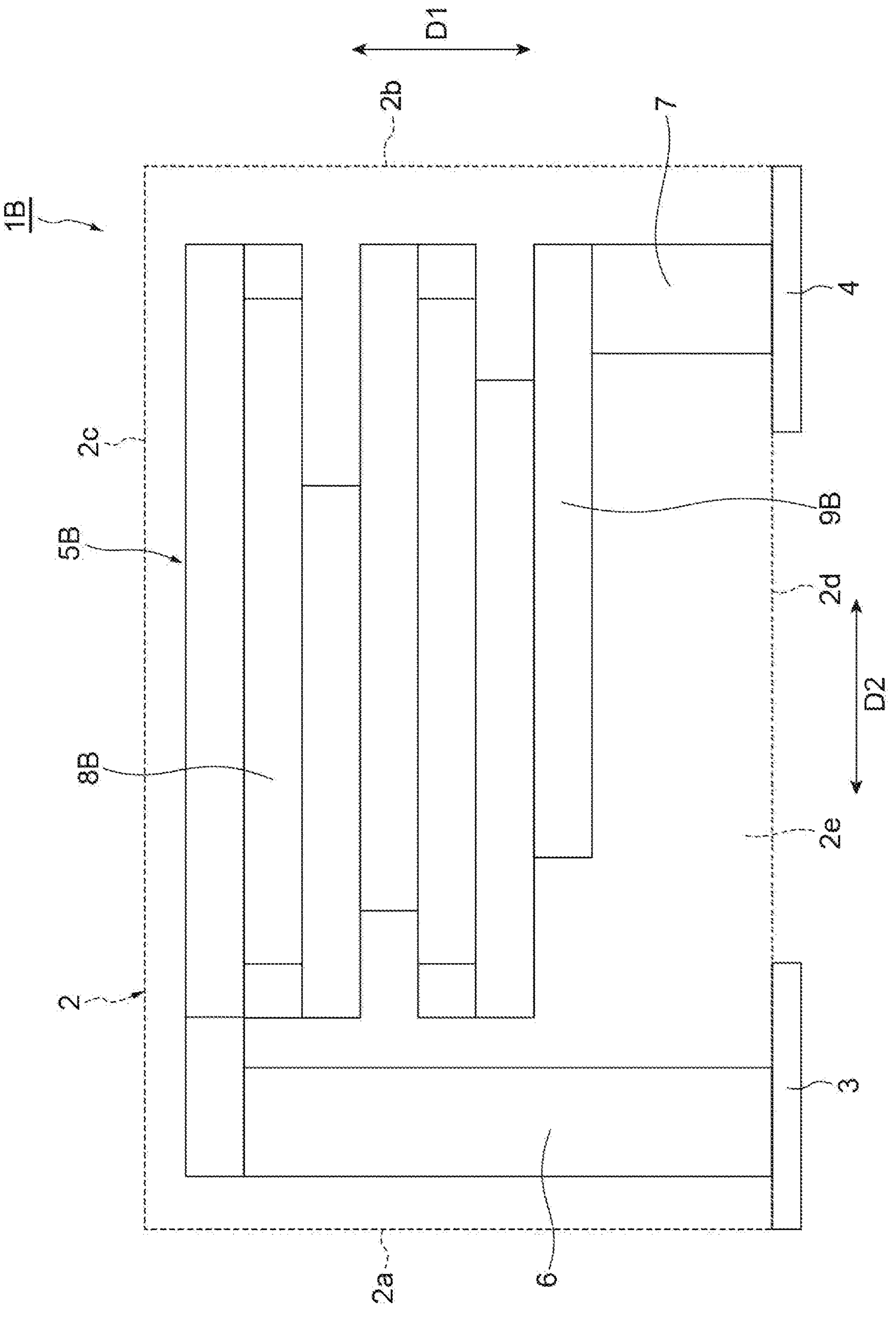
FIG. 8 is a side view of the multilayer coil component shown in FIG. 7.

Subsequently, a multilayer coil component according to a third embodiment will be described with reference to FIGS. 7 and 8. FIG. 7 is a perspective view of the multilayer coil component according to the third embodiment. FIG. 8 is a side view of the multilayer coil component shown in FIG. 7. As shown in FIGS. 7 and 8, a multilayer coil component 1B according to the third embodiment includes an element body 2, a first terminal electrode 3, a second terminal electrode 4, a coil 5B, a first connection conductor 6, and a second connection conductor 7. In FIGS. 7 and 8, the element body 2 is shown by a broken line for convenience of explanation.

The element body 2 is formed by stacking a plurality of element body layers 30*a* to 30*k* (see FIG. 9) in the first direction D1.

The coil 5B is disposed in the element body 2. The coil 5B is constituted by a plurality of coil conductor layers 32*b* to 32*h* (see FIG. 9). The plurality of coil conductor layers 32*b* to 32*h* are connected to each other to constitute the coil 5B in the element body 2. A coil axis of the coil 5B is provided in the first direction D1. The coil conductor layers 32*b* to 32*h* are disposed such that at least parts thereof overlap each other when viewed in the first direction D1. The plurality of coil conductor layers 32*b* to 32*h* are made of a conductive material (for example, Ag or Pd). The coil conductor layers 32*b* to 32*h* are disposed apart from the end surfaces 2*a* and 2*b*, the main surfaces 2*c* and 2*d*, and the side surfaces 2*e* and 2*f*.

The coil 5B includes a first coil portion 8B and a second coil portion 9B. The first coil portion 8B is constituted by the plurality of coil conductor layers 32*b* to 32*f*. The first coil portion 8B is disposed on a side of the main surface 2*c* of the element body 2. The first coil portion 8B has one end of the coil 5B connected to the first connection conductor 6. The first coil portion 8B is connected to the first connection conductor 6. The second coil portion 9B is constituted by the plurality of coil conductor layers 32*g* and 32*h*. The second coil portion 9B is disposed on a side of the main surface 2*d* of the element body 2. The second coil portion 9B has the other end of the coil 5B connected to the second connection conductor 7. The second coil portion 9B is connected to the second connection conductor 7.

Figure 9:
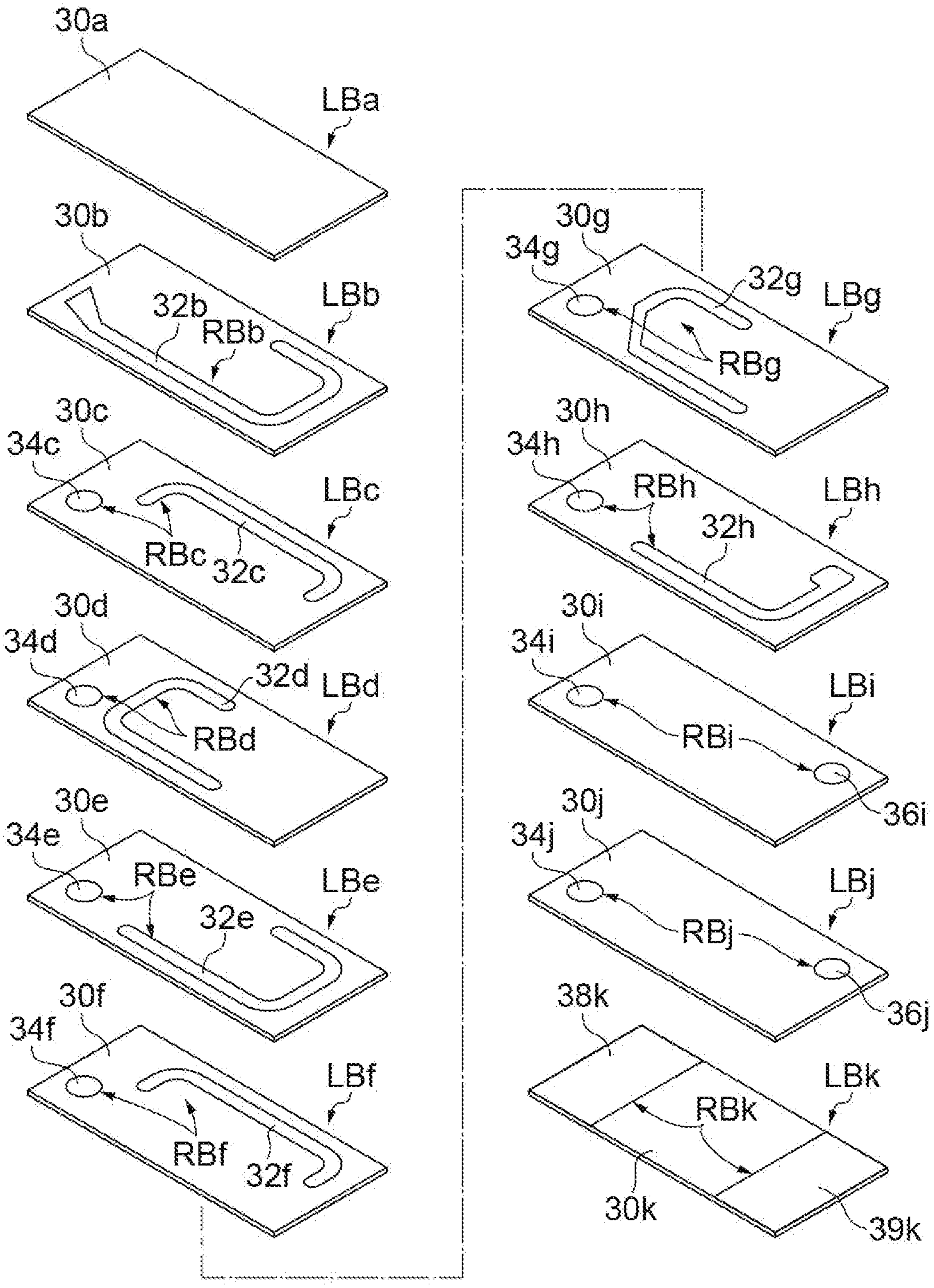
FIG. 9 is an exploded perspective view of the multilayer coil component shown in FIG. 7.

FIG. 9 is an exploded perspective view of the multilayer coil component. As shown in FIG. 9, the multilayer coil component 1B includes a plurality of layers LBa, LBb, LBc, LBd, LBe, LBf, LBg, LBh, LBi, LBj, and LBk. The multilayer coil component 1B is constituted by the layers LBa to LBk being stacked in order from a side of the main surface 2*c*, for example.

The layer LBa is constituted by the element body layer 30*a*.

The layer LBb is formed by combining the element body layer 30*b* and the coil conductor layer 32*b* with each other. The element body layer 30*b* is provided with a defective portion RBb. The layer LBc is formed by combining the element body layer 30*c*, the coil conductor layer 32*c*, and a first connection conductor layer 34*c* with each other. The element body layer 30*c* is provided with a defective portion RBc.

The layer LBd is formed by combining the element body layer 30*d*, the coil conductor layer 32*d*, and a first connection conductor layer 34*d* with each other. The element body layer 30*d* is provided with a defective portion RBd. The layer LBe is formed by combining the element body layer 30*e*, the coil conductor layer 32*e*, and a first connection conductor layer 34*e* with each other. The element body layer 30*e* is provided with a defective portion RBe.

The layer LBf is formed by combining the element body layer 30*f*, the coil conductor layer 32*f*, and a first connection conductor layer 34*f* with each other. The element body layer 30*f* is provided with a defective portion RBf. The layer LBg is formed by combining the element body layer 30*g*, the coil conductor layer 32*g*, and a first connection conductor layer 34*g* with each other. The element body layer 30*g* is provided with a defective portion RBg.

The layer LBh is formed by combining the element body layer 30*h*, the coil conductor layer 32*h*, and a first connection conductor layer 34*h* with each other. The element body layer 30*h* is provided with a defective portion RBh. The layer LBi is formed by combining the element body layer 30*i*, a first connection conductor layer 34*i*, and a second connection conductor layer 36*i* with each other. The element body layer 30*i* is provided with a defective portion RBi.

The layer LBj is formed by combining the element body layer 30*j*, a first connection conductor layer 34*j*, and a second connection conductor layer 36*j* with each other. The element body layer 30*j* is provided with a defective portion RBj. The layer LBk is formed by combining the element body layer 30*k*, a first terminal electrode layer 38*k*, and a second terminal electrode layer 39*k* with each other. The element body layer 30*k* is provided with a defective portion RBk.

Figure 10:
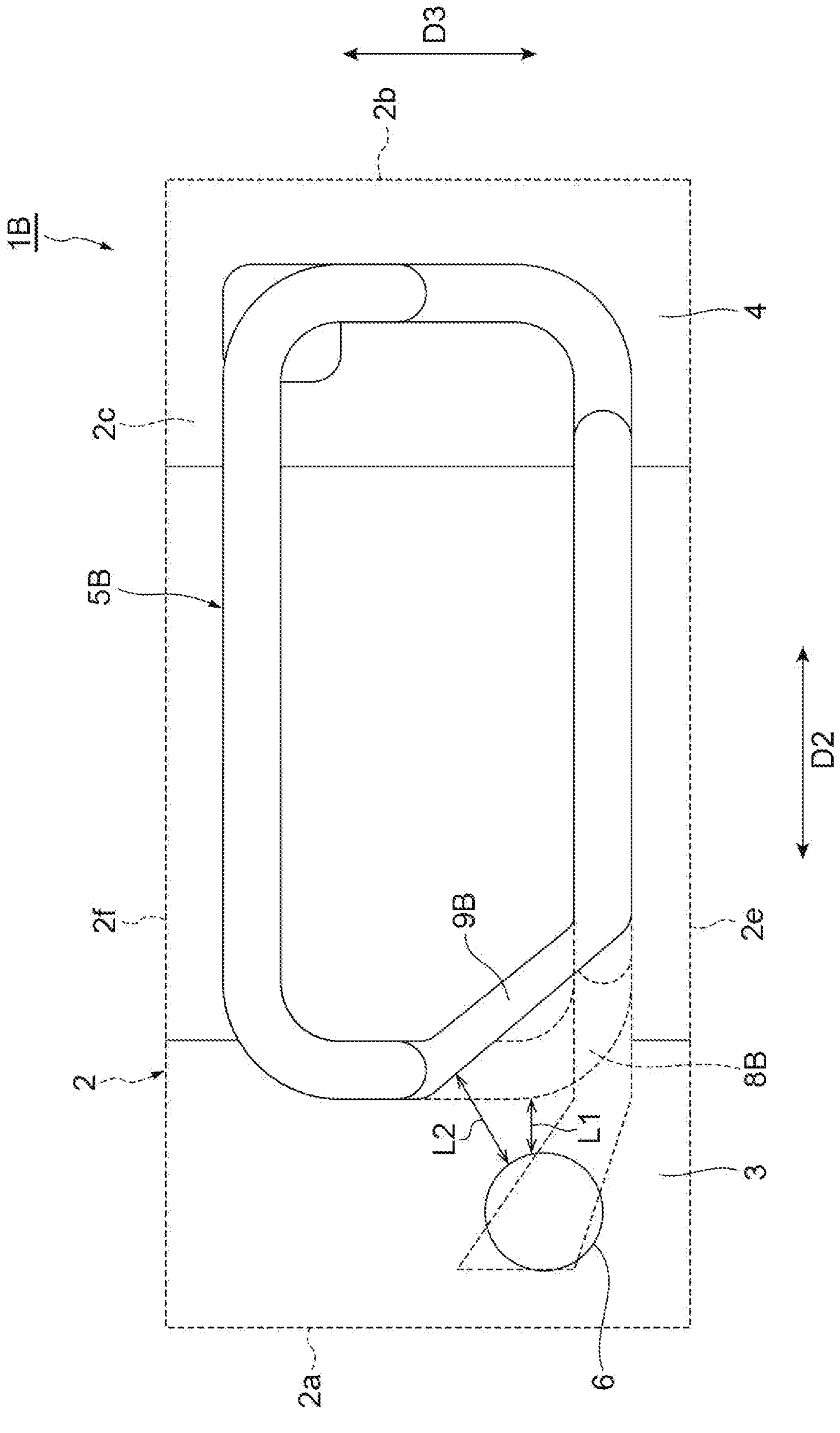
FIG. 10 is a top view of the multilayer coil component shown in FIG. 7.

As shown in FIG. 10, in the multilayer coil component 1B, a distance L2 between the first connection conductor 6 and the second coil portion 9B is larger than a distance L1 between the first connection conductor 6 and the first coil portion 8B. In other words, the distance L1 between the first connection conductor 6 and the first coil portion 8B is smaller than the distance L2 between the first connection conductor 6 and the second coil portion 9B. That is, the second coil portion 9B is disposed farther from the first connection conductor 6 than the first coil portion 8B. In the multilayer coil component 1B, in the coil conductor layer 32*g* constituting the second coil portion 9B, a portion facing the first connection conductor 6 is set as an oblique side. As a result, in the multilayer coil component 1B, the distance L2 between the first connection conductor 6 and the second coil portion 9B is larger than the distance L1 between the first connection conductor 6 and the first coil portion 8B. The distance L1 is the shortest distance between the first connection conductor 6 and the first coil portion 8B (the coil conductor layers 32*b* to 32*f*). The distance L2 is the shortest distance between the first connection conductor 6 and the second coil portion 9B (the coil conductor layers 32*g* and 32*h*). In FIG. 10, the distance L1 and the distance L2 are shown as an example for convenience and may differ from the actual shortest distance.

The diameter of the first coil portion 8B and the diameter of the second coil portion 9B are substantially equivalent to each other. A coil axis of the first coil portion 8B and a coil axis of the second coil portion 9B substantially coincide with each other. When viewed in the first direction D1, parts of the coil conductor layer 32*b* and the coil conductor layer 32*e* constituting the first coil portion 8B and a part of the coil conductor layer 32*h* constituting the second coil portion 9B overlap each other.

As described above, in the multilayer coil component 1B according to the present embodiment, similarly to the multilayer coil component 1, the distance L2 between the first connection conductor 6 and the second coil portion 9B is larger than the distance L1 between the first connection conductor 6 and the first coil portion 8B. As a result, in the multilayer coil component 1B, the second coil portion 9B with a large potential difference from the first connection conductor 6 is disposed farther from the first connection conductor 6 than the first coil portion 8B. Therefore, in the multilayer coil component 1B, stray capacitance formed between the first connection conductor 6 and the second coil portion 9B can be reduced. Further, in the multilayer coil component 1B, the diameter of the first coil portion 8B can be increased. Therefore, the inductance of the coil 5B can be increased. As described above, in the multilayer coil component 1B, it is possible to suppress the generation of stray capacitance and to increase the characteristics.

In the multilayer coil component 1B according to the present embodiment, in the coil conductor layer 32*g* constituting the second coil portion 9B, a portion facing the first connection conductor 6 is set as an oblique side. As a result, in the multilayer coil component 1B, the distance L2 between the first connection conductor 6 and the second coil portion 9B is larger than the distance L1 between the first connection conductor 6 and the first coil portion 8B. In this configuration, the diameter of the second coil portion 9B can be increased. Therefore, in the multilayer coil component 1B, the characteristics can be improved.

Fourth Embodiment

Figure 11:
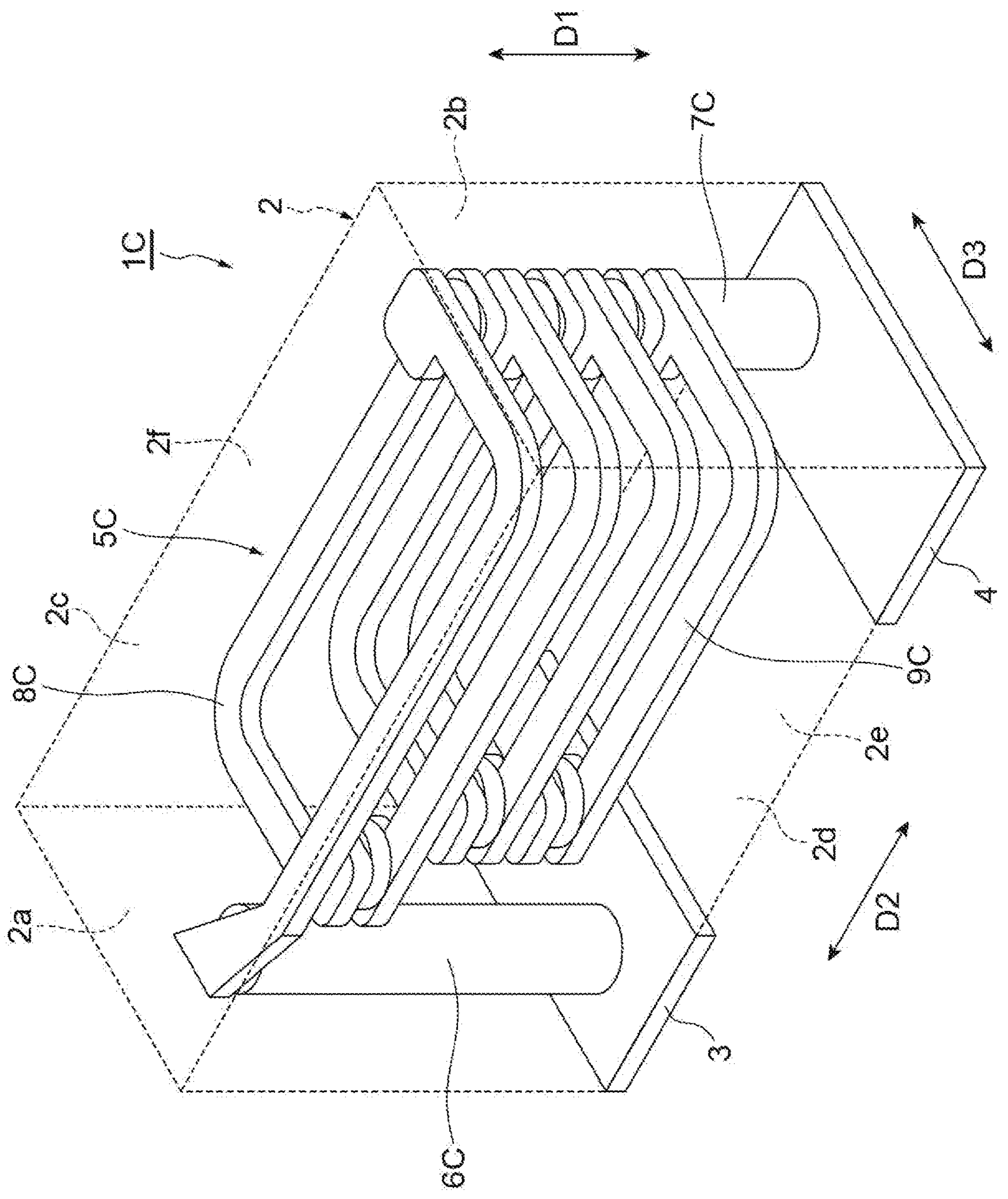
FIG. 11 is a perspective view of a multilayer coil component according to a fourth embodiment.
Figure 12:
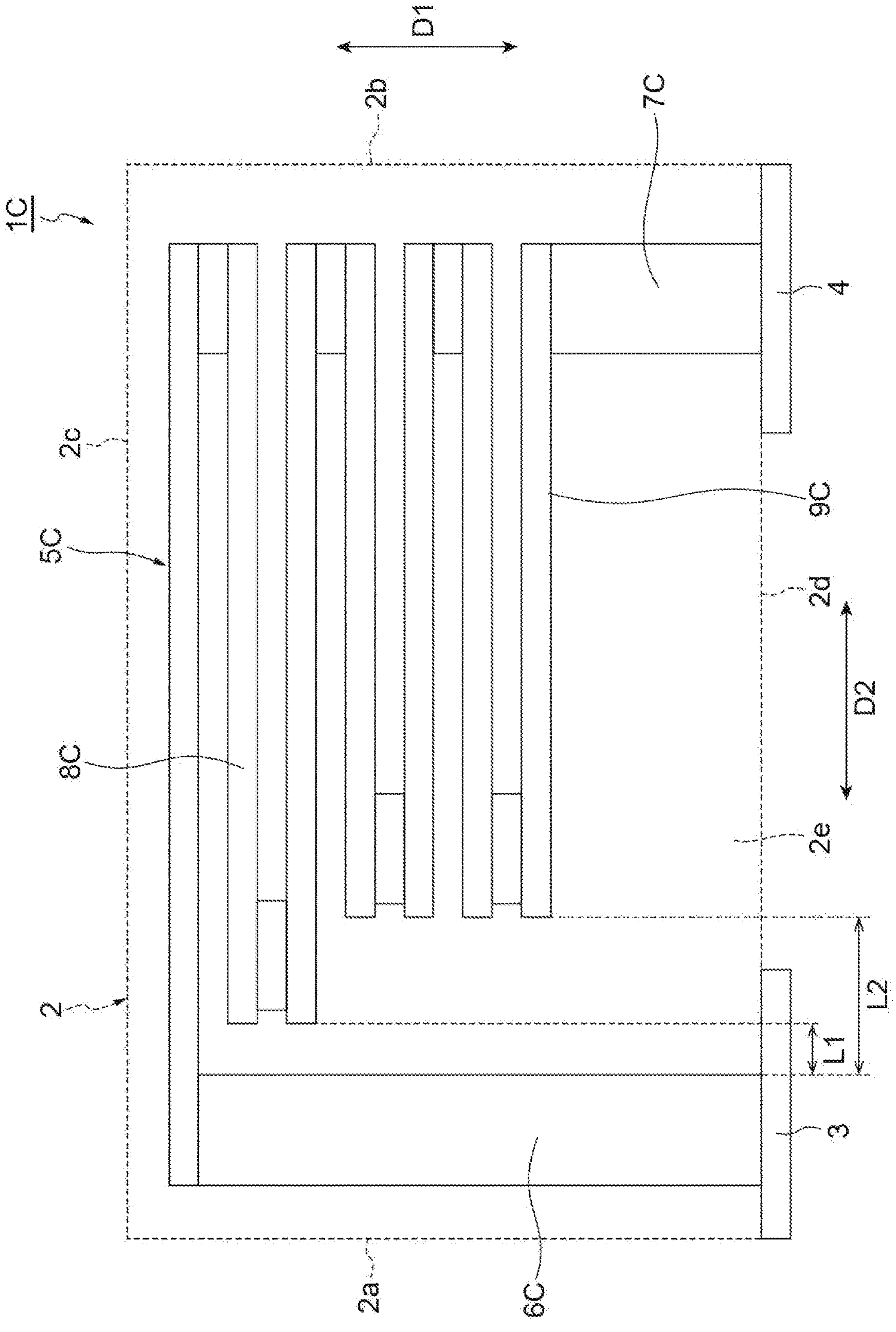
FIG. 12 is a side view of the multilayer coil component shown in FIG. 11.

Subsequently, a multilayer coil component according to a fourth embodiment will be described with reference to FIGS. 11 and 12. FIG. 11 is a perspective view of the multilayer coil component according to the fourth embodiment. FIG. 12 is a side view of the multilayer coil component shown in FIG. 11. As shown in FIGS. 11 and 12, a multilayer coil component 1C according to the fourth embodiment includes an element body 2, a first terminal electrode 3, a second terminal electrode 4, a coil 5C, a first connection conductor 6C, and a second connection conductor 7C. In FIGS. 11 and 12, the element body 2 is shown by a broken line for convenience of explanation.

The element body 2 is formed by stacking a plurality of element body layers 40*a* to 40*k* (see FIG. 13) in the first direction D1.

The coil 5C is disposed in the element body 2. The coil 5C is constituted by a plurality of coil conductor layers 42*b* to 42*h* (see FIG. 13) and a plurality of through hole conductors 43*a* to 43*h*. The plurality of coil conductor layers 42*b* to 42*h* are connected to each other by the plurality of through hole conductors 43*a* to 43*h* to constitute the coil 5C in the element body 2. A coil axis of the coil 5C is provided in the first direction D1. The coil conductor layers 42*b* to 42*h* are disposed such that at least parts thereof overlap each other when viewed in the first direction D1. The plurality of coil conductor layers 42*b* to 42*h* are made of a conductive material (for example, Ag or Pd). The coil conductor layers 42*b* to 42*h* are disposed apart from the end surfaces 2*a* and 2*b*, the main surfaces 2*c* and 2*d*, and the side surfaces 2*e* and 2*f*.

The coil 5C includes a first coil portion 8C and a second coil portion 9C. The first coil portion 8C is constituted by the plurality of coil conductor layers 42*b* to 42*d*. The first coil portion 8C is disposed on a side of the main surface 2*c* of the element body 2. The first coil portion 8C has one end of the coil 5C connected to the first connection conductor 6C. The first coil portion 8C is connected to the first connection conductor 6C. The second coil portion 9C is constituted by the plurality of coil conductor layers 42*e* to 42*h*. The second coil portion 9C is disposed on a side of the main surface 2*d* of the element body 2. The second coil portion 9C has the other end of the coil 5C connected to the second connection conductor 7C. The second coil portion 9C is connected to the second connection conductor 7C.

The first connection conductor 6C is disposed in the element body 2. The first connection conductor 6C connects the first terminal electrode 3 and the coil 5C to each other. The first connection conductor 6C is a through hole conductor. The first connection conductor 6C is constituted by a plurality of first through hole conductor layers 44*c* to 44*j* (see FIG. 13).

The second connection conductor 7C is disposed in the element body 2. The second connection conductor 7C connects the second terminal electrode 4 and the coil 5C to each other. The second connection conductor 7C is a through hole conductor. The second connection conductor 7C is constituted by a plurality of second through hole conductor layers 46*i* and 46*j* (see FIG. 13).

Figure 13:
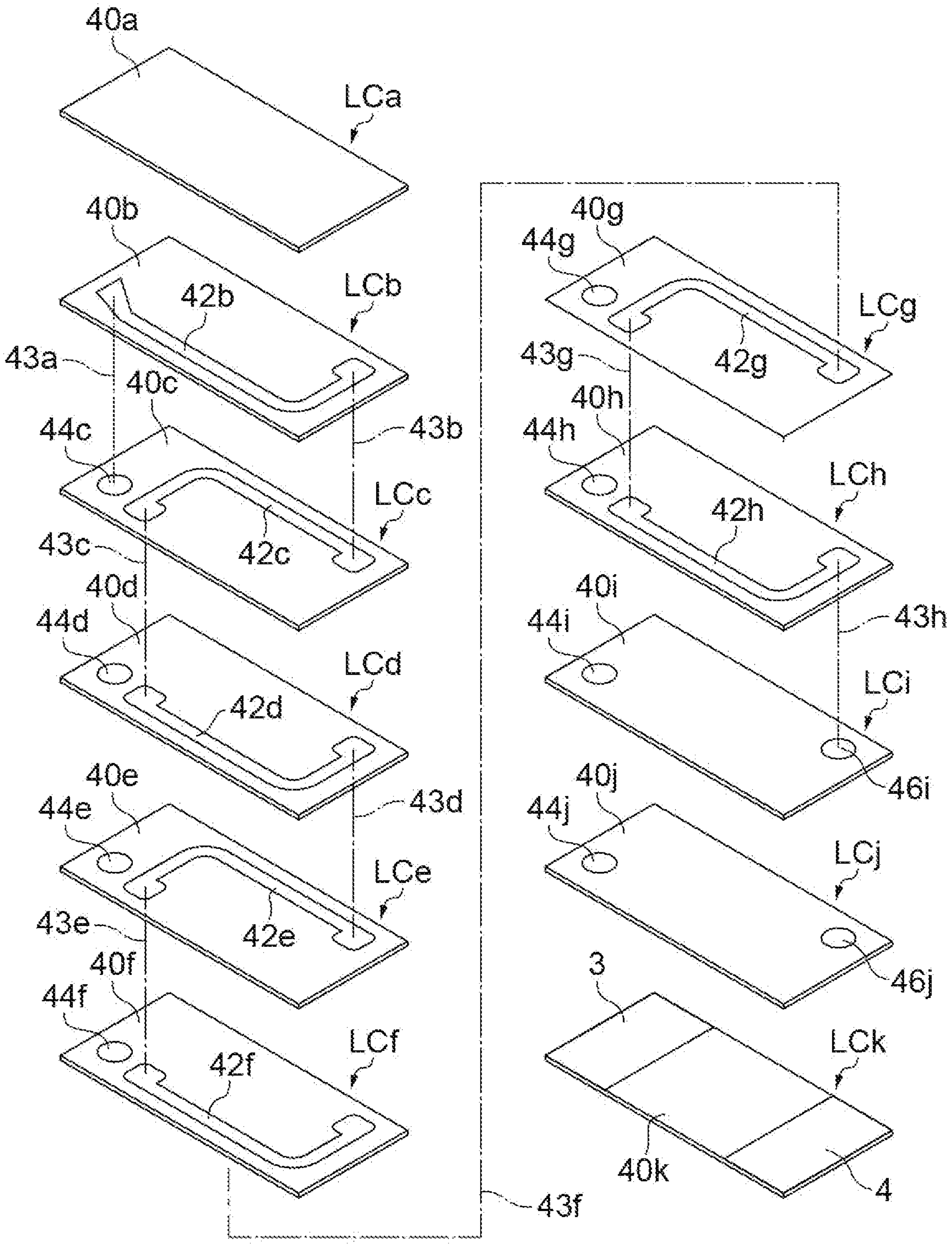
FIG. 13 is an exploded perspective view of the multilayer coil component shown in FIG. 11.

FIG. 13 is an exploded perspective view of the multilayer coil component. As shown in FIG. 13, the multilayer coil component 1C includes a plurality of layers LCa, LCb, LCc, LCd, LCe, LCf, LCg, LCh, LCi, LCj, and LCk. The multilayer coil component 1C is constituted by the layers LCa to LCk being stacked in order from a side of the main surface 2*c*, for example.

The layer LCa is constituted by the element body layer 40*a*.

The layer LCb is formed by providing the coil conductor layer 42*b* on the element body layer 40*b*. The layer LCc is formed by providing the coil conductor layer 42*c* on the element body layer 40*c* and by being provided with the first through hole conductor layer 44*c*. The coil conductor layer 42*b* and the first through hole conductor layer 44*c* are connected to each other by the through hole conductor 43*a*. The coil conductor layer 42*b* and the coil conductor layer 42*c* are connected to each other by the through hole conductor 43*b*.

The layer LCd is formed by providing the coil conductor layer 42*d* on the element body layer 40*d* and by being provided with the first through hole conductor layer 44*d*. The coil conductor layer 42*c* and the coil conductor layer 42*d* are connected to each other by the through hole conductor 43*c*.

The layer LCe is formed by providing the coil conductor layer 42*e* on the element body layer 40*e* and by being provided with the first through hole conductor layer 44*e*. The coil conductor layer 42*d* and the coil conductor layer 42*e* are connected to each other by the through hole conductor 43*d*.

The layer LCf is formed by providing the coil conductor layer 42*f* on the element body layer 40*f* and by being provided with the first through hole conductor layer 44*f*. The coil conductor layer 42*e* and the coil conductor layer 42*f* are connected to each other by the through hole conductor 43*e*.

The layer LCg is formed by providing the coil conductor layer 42*g* on the element body layer 40*g* and by being provided with the first through hole conductor layer 44*g*. The coil conductor layer 42*f* and the coil conductor layer 42*g* are connected to each other by the through hole conductor 43*f*.

The layer LCh is formed by providing the coil conductor layer 42*h* on the element body layer 40*h* and by being provided with the first through hole conductor layer 44*h*. The coil conductor layer 42*g* and the coil conductor layer 42*h* are connected to each other by the through hole conductor 43*g*.

The layer LCi is formed by providing the first through hole conductor layer 44*i* and the second through hole conductor layer 46*i* in the element body layer 40*i*. The coil conductor layer 42*h* and the second through hole conductor layer 46*i* are connected to each other by the through hole conductor 43*h*.

The layer LCj is formed by providing the first through hole conductor layer 44*j* and the second through hole conductor layer 46*j* in the element body layer 40*j*. The layer LCk is formed by providing the first terminal electrode 3 and the second terminal electrode 4 in the element body layer 40*k*.

As shown in FIG. 12, in the multilayer coil component 1C, a distance L2 between the first connection conductor 6C and the second coil portion 9C is larger than a distance L1 between the first connection conductor 6C and the first coil portion 8C. In other words, the distance L1 between the first connection conductor 6C and the first coil portion 8C is smaller than the distance L2 between the first connection conductor 6C and the second coil portion 9C. That is, the second coil portion 9C is disposed farther from the first connection conductor 6C than the first coil portion 8C. The distance L1 is the shortest distance between the first connection conductor 6C and the first coil portion 8C (the coil conductor layers 42*b* to 42*d*). The distance L2 is the shortest distance between the first connection conductor 6C and the second coil portion 9C (the coil conductor layers 42*e* to 42*h*). In FIG. 12, the distance L1 and the distance L2 are shown as an example for convenience and may differ from the actual shortest distance.

A diameter of the first coil portion 8C and a diameter of the second coil portion 9C are different. The diameter of the first coil portion 8C is larger than the diameter of the second coil portion 9C. In other words, the diameter of the second coil portion 9C is smaller than the diameter of the first coil portion 8C. A coil axis of the first coil portion 8C and a coil axis of the second coil portion 9C do not coincide with each other. The coil axis of the second coil portion 9C is located closer to the end surface 2*b* than the coil axis of the first coil portion 8C. An edge of the first coil portion 8C and an edge of the second coil portion 9C on a side of the end surface 2*b* of the element body 2 coincide with each other in the first direction D1. Specifically, when viewed in the first direction D1, parts of the coil conductor layer 42*b* and coil conductor layer 42*d* constituting the first coil portion 8C and parts of the coil conductor layer 42*f* and the coil conductor layer 42*h* constituting the second coil portion 9C overlap each other.

The second coil portion 9C does not overlap the first terminal electrode 3 when viewed in the first direction D1. That is, the second coil portion 9C is not located above the first terminal electrode 3. Specifically, the coil conductor layers 42*e* to 42*h* do not overlap the first terminal electrode 3 when viewed in the first direction D1.

Subsequently, a method of manufacturing the multilayer coil component 1C will be described.

Slurry is prepared by mixing an insulating resin and a solvent. The prepared slurry is applied onto a base material (for example, a PET film) by a doctor blade method to form green sheets to be the element body layers 40*a* to 40*k*. Next, through holes are formed by laser processing at planned formation positions of the through hole conductors 43*a* to 43*h*, the first through hole conductor layers 44*b* to 44*j*, and the second through hole conductor layers 46*i* and 46*j* in the green sheets.

Subsequently, the through holes of the green sheets are filled with a first conductive paste. The first conductive paste is produced by mixing conductive metal powder, a binder resin, and the like. Subsequently, conductors to be the coil conductor layers 42*b* to 42*h* are provided on the green sheet. At this time, the conductors are connected to the conductive pastes in the through holes.

Subsequently, the green sheets are stacked. Here, a plurality of green sheets provided with the conductors are detached from the base material and stacked, and pressure is applied in the stacking direction to form a multilayer body. At this time, the green sheets are stacked such that the conductors to be the coil conductor layers 42*b* to 42*h* overlap each other in the stacking direction.

Subsequently, the multilayer body of the green sheets is cut into a chip of a predetermined size with a cutting machine to obtain a green chip. Subsequently, after the binder resin contained in each portion is removed from the green chip, the green chip is fired. As a result, the element body 2 is obtained.

Subsequently, a second conductive paste is provided on the main surface 2*d* of the element body 2. The second conductive paste is produced by mixing conductive metal powder, glass frit, a binder resin, and the like. Subsequently, the second conductive paste is baked in the element body 2 by heat treatment to form the first terminal electrode 3 and the second terminal electrode 4. If necessary, the first terminal electrode 3 and the second terminal electrode 4 may be provided with a plated layer by being subjected to electroplating or electroless plating. By the above steps, the multilayer coil component 1C is obtained.

As described above, in the multilayer coil component 1C according to the present embodiment, similarly to the multilayer coil component 1, the distance L2 between the first connection conductor 6C and the second coil portion 9C is larger than the distance L1 between the first connection conductor 6C and the first coil portion 8C. As a result, in the multilayer coil component 1C, the second coil portion 9C with a large potential difference from the first connection conductor 6C is disposed farther from the first connection conductor 6C than the first coil portion 8C. Therefore, in the multilayer coil component 1C, stray capacitance formed between the first connection conductor 6C and the second coil portion 9C can be reduced. Further, in the multilayer coil component 1C, the diameter of the first coil portion 8C can be increased. Therefore, the inductance of the coil 5C can be increased. As described above, in the multilayer coil component 1C, it is possible to suppress the generation of stray capacitance and to increase the characteristics.

Fifth Embodiment

Figure 14:
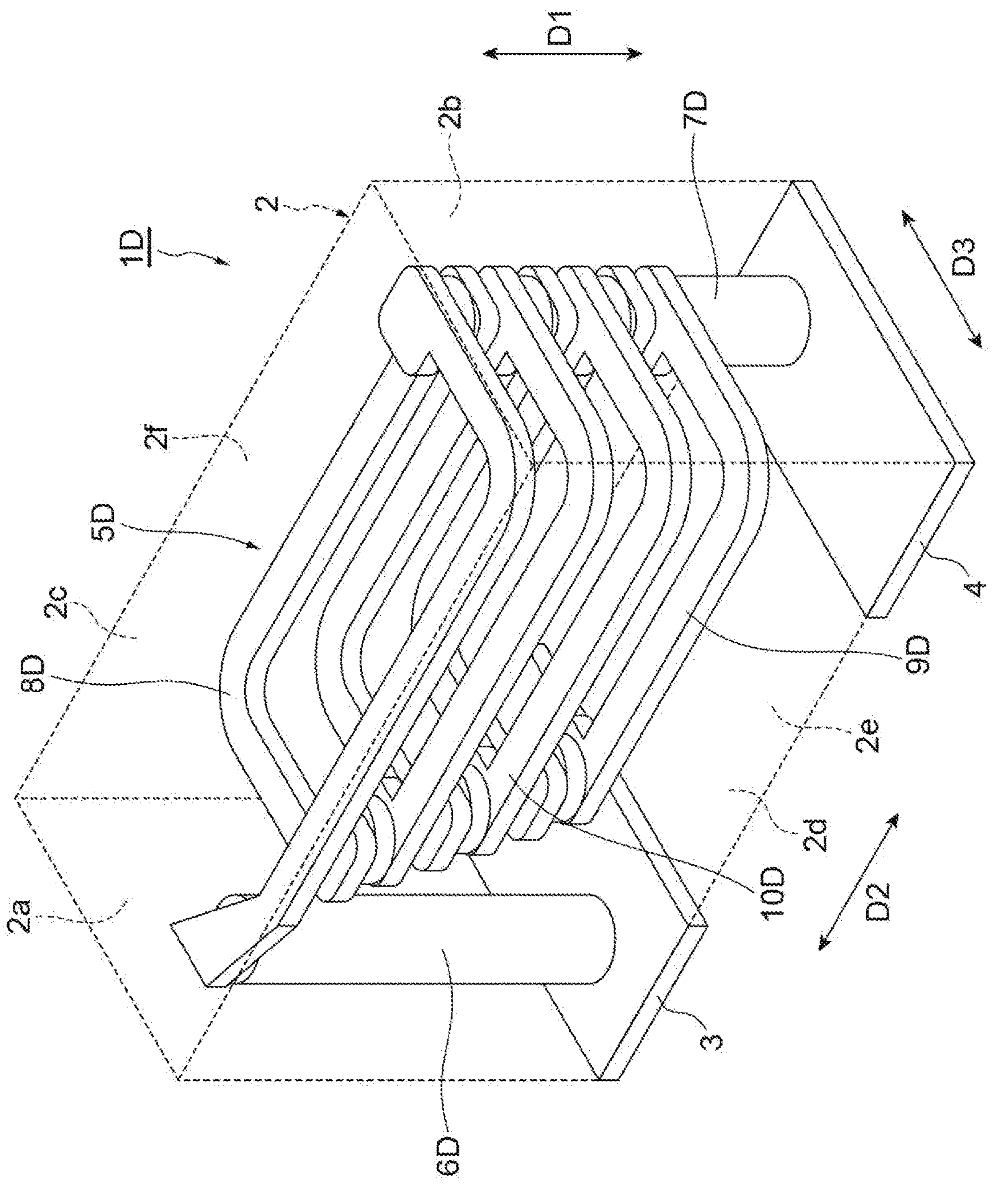
FIG. 14 is a perspective view of a multilayer coil component according to a fifth embodiment.
Figure 15:
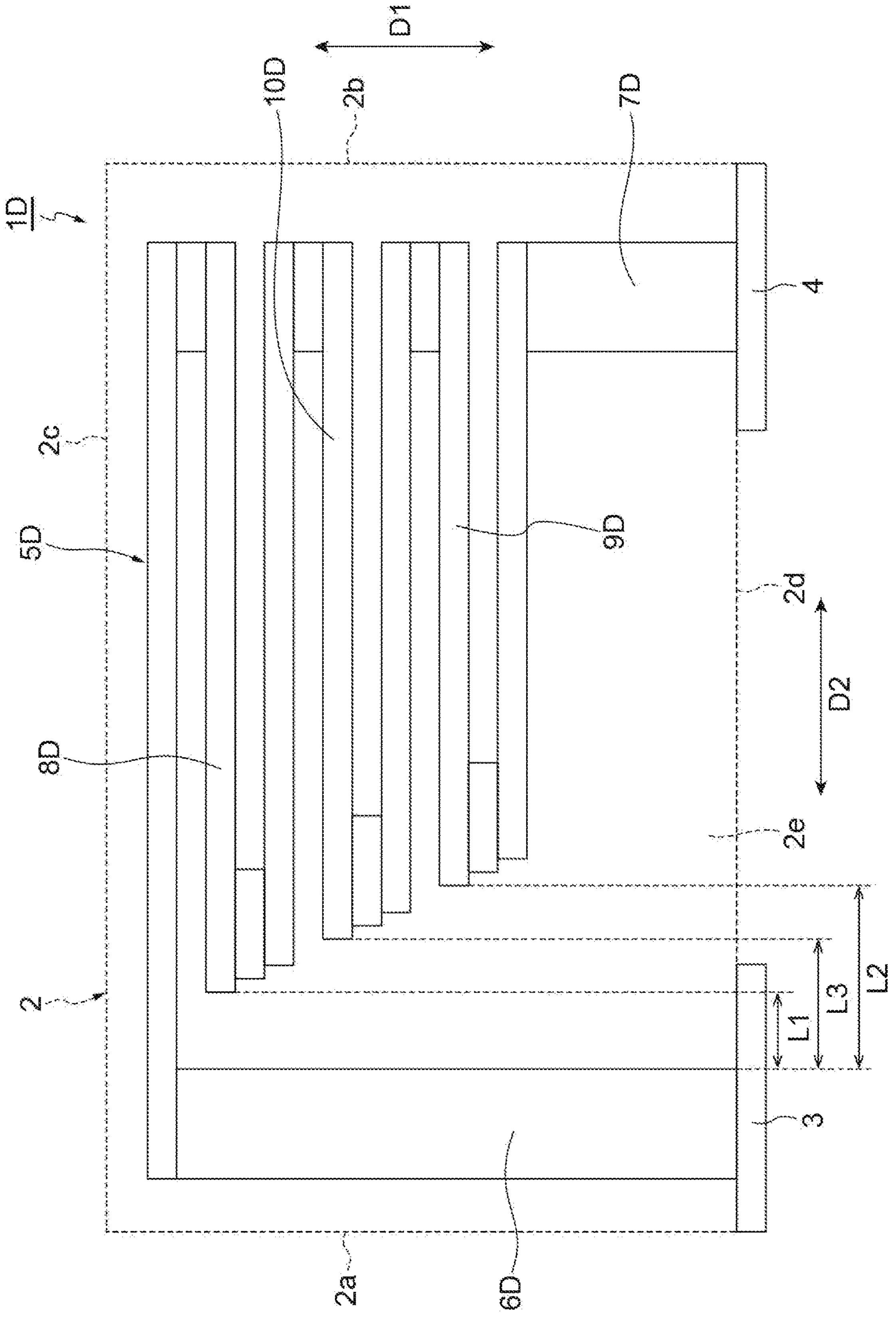
FIG. 15 is a side view of the multilayer coil component shown in FIG. 14.

Subsequently, a multilayer coil component according to a fifth embodiment will be described with reference to FIGS. 14 and 15. FIG. 14 is a perspective view of the multilayer coil component according to the fifth embodiment. FIG. 15 is a side view of the multilayer coil component shown in FIG. 14. As shown in FIGS. 14 and 15, a multilayer coil component 1D according to the fifth embodiment includes an element body 2, a first terminal electrode 3, a second terminal electrode 4, a coil 5D, a first connection conductor 6D, and a second connection conductor 7D. In FIGS. 14 and 15, the element body 2 is shown by a broken line for convenience of explanation.

The element body 2 is formed by stacking a plurality of element body layers 50*a* to 50*k* (see FIG. 16) in the first direction D1.

The coil 5D is disposed in the element body 2. The coil 5D is constituted by a plurality of coil conductor layers 52*b* to 52*h* (see FIG. 16) and a plurality of through hole conductors 53*a* to 53*h*. The plurality of coil conductor layers 52*b* to 52*h* are connected to each other by the plurality of through hole conductors 53*a* to 53*h* to constitute the coil 5D in the element body 2. A coil axis of the coil 5D is provided in the first direction D1. The coil conductor layers 52*b* to 52*h* are disposed such that at least parts thereof overlap each other when viewed in the first direction D1. The plurality of coil conductor layers 52*b* to 52*h* are made of a conductive material (for example, Ag or Pd). The coil conductor layers 52*b* to 52*h* are disposed apart from the end surfaces 2*a* and 2*b*, the main surfaces 2*c* and 2*d*, and the side surfaces 2*e* and 2*f*.

The coil 5D includes a first coil portion 8D, a second coil portion 9D, and a third coil portion 10D. The first coil portion 8D is constituted by the plurality of coil conductor layers 52*b* to 52*d*. The first coil portion 8D is disposed on a side of the main surface 2*c* of the element body 2. The first coil portion 8D has one end of the coil 5D connected to the first connection conductor 6D. The first coil portion 8D is connected to the first connection conductor 6D. The second coil portion 9D is constituted by the plurality of coil conductor layers 52*g* and 52*h*. The second coil portion 9D is disposed on a side of the main surface 2*d* of the element body 2. The second coil portion 9D has the other end of the coil 5D connected to the second connection conductor 7D. The second coil portion 9D is connected to the second connection conductor 7D. The third coil portion 10D is constituted by the plurality of coil conductor layers 52*e* and 52*f*. The third coil portion 10D is disposed between the first coil portion 8D and the second coil portion 9D. One end of the third coil portion 10D is connected to the first coil portion 8D, and the other end of the third coil portion 10D is connected to the second coil portion 9D.

The first connection conductor 6D is disposed in the element body 2. The first connection conductor 6D connects the first terminal electrode 3 and the coil 5D to each other. The first connection conductor 6D is a through hole conductor. The first connection conductor 6D is constituted by a plurality of first through hole conductor layers 54*c* to 54*j* (see FIG. 16).

The second connection conductor 7D is disposed in the element body 2. The second connection conductor 7D connects the second terminal electrode 4 and the coil 5D to each other. The second connection conductor 7D is a through hole conductor. The second connection conductor 7D is constituted by a plurality of second through hole conductor layers 56*i* and 56*j* (see FIG. 16).

Figure 16:
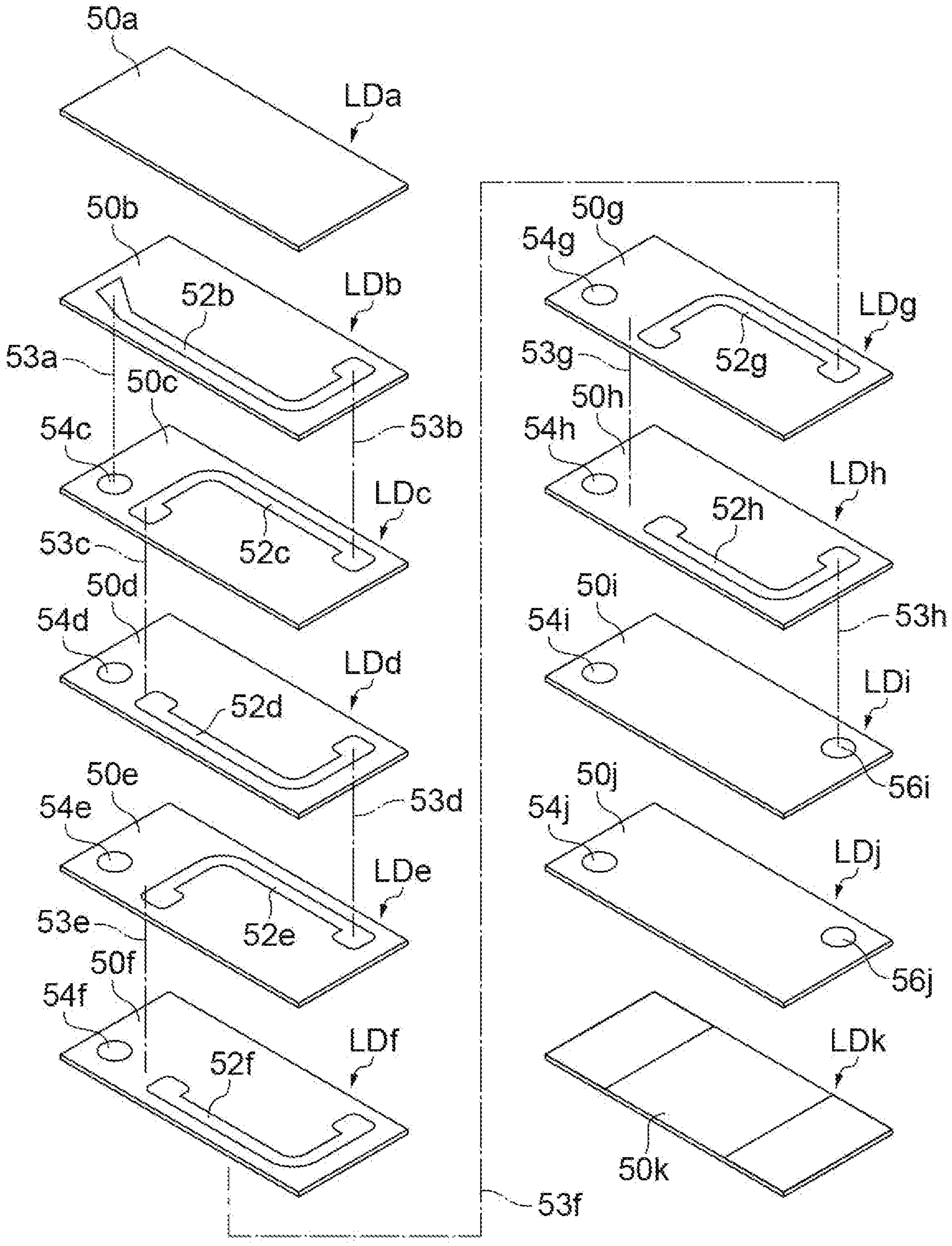
FIG. 16 is an exploded perspective view of the multilayer coil component shown in FIG. 14.

FIG. 16 is an exploded perspective view of the multilayer coil component. As shown in FIG. 16, the multilayer coil component 1D includes a plurality of layers LDa, LDb, LDc, LDd, LDe, LDf, LDg, LDh, LDi, LDj, and LDk. The multilayer coil component 1D is constituted by the layers LDa to LDk being stacked in order from a side of the main surface 2*c*, for example.

The layer LDa is constituted by the element body layer 50*a*.

The layer LDb is formed by providing the coil conductor layer 52*b* on the element body layer 50*b*. The layer LDc is formed by providing the coil conductor layer 52*c* on the element body layer 50*c* and by being provided with the first through hole conductor layer 54*c*. The coil conductor layer 52*b* and the first through hole conductor layer 54*c* are connected to each other by the through hole conductor 53*a*. The coil conductor layer 52*b* and the coil conductor layer 52*c* are connected to each other by the through hole conductor 53*b*.

The layer LDd is formed by providing the coil conductor layer 52*d* on the element body layer 50*d* and by being provided with the first through hole conductor layer 54*d*. The coil conductor layer 52*c* and the coil conductor layer 52*d* are connected to each other by the through hole conductor 53*c*.

The layer LDe is formed by providing the coil conductor layer 52*e* on the element body layer 50*e* and by being provided with the first through hole conductor layer 54*e*. The coil conductor layer 52*d* and the coil conductor layer 52*e* are connected to each other by the through hole conductor 53*d*.

The layer LDf is formed by providing the coil conductor layer 52*f* on the element body layer 50*f* and by being provided with the first through hole conductor layer 54*f*. The coil conductor layer 52*e* and the coil conductor layer 52*f* are connected to each other by the through hole conductor 53*e*.

The layer LDg is formed by providing the coil conductor layer 52*g* on the element body layer 50*g* and by being provided with the first through hole conductor layer 54*g*. The coil conductor layer 52*f* and the coil conductor layer 52*g* are connected to each other by the through hole conductor 53*f*.

The layer LDh is formed by providing the coil conductor layer 52*h* on the element body layer 50*h* and by being provided with the first through hole conductor layer 54*h*. The coil conductor layer 52*g* and the coil conductor layer 52*h* are connected to each other by the through hole conductor 53*g*.

The layer LDi is formed by providing the first through hole conductor layer 54*i* and the second through hole conductor layer 56*i* in the element body layer 50*i*. The coil conductor layer 52*h* and the second through hole conductor layer 56*i* are connected to each other by the through hole conductor 53*h*.

The layer LDj is formed by providing the first through hole conductor layer 54*j* and the second through hole conductor layer 56*j* in the element body layer 50*j*. The layer LDk is formed by providing the first terminal electrode 3 and the second terminal electrode 4 in the element body layer 50*k*.

As shown in FIG. 15, in the multilayer coil component 1D, a distance L2 between the first connection conductor 6D and the second coil portion 9D is larger than a distance L1 between the first connection conductor 6D and the first coil portion 8D. In other words, the distance L1 between the first connection conductor 6D and the first coil portion 8D is smaller than the distance L2 between the first connection conductor 6D and the second coil portion 9D. That is, the second coil portion 9D is disposed farther from the first connection conductor 6D than the first coil portion 8D. Further, a distance L3 between the first connection conductor 6D and the third coil portion 10D is larger than the distance L1 between the first connection conductor 6D and the first coil portion 8D and smaller than the distance L2 between the first connection conductor 6D and the second coil portion 9D (L1>L3>L2).

In the multilayer coil component 1D, the distances L1, L2, and L3 between the first connection conductor 6D and the first, second, and third coil portions 8D, 9D, and 10D are set on the basis of a potential difference generated when the multilayer coil component 1D is used. Specifically, in the multilayer coil component 1D, the distances L1, L2, and L3 between the first connection conductor 6D and the first, second, and third coil portions 8D, 9D, and 10D are set such that the larger a potential difference between the coil portion and the first connection conductor 6D, the larger a distance between the coil portion and the first connection conductor 6D. The potential difference is the largest between the first connection conductor 6D and the second coil portion 9D and is the smallest between the first connection conductor 6D and the first coil portion 8D. The potential difference becomes larger in the order of the potential difference between the first connection conductor 6D and the first coil portion 8D, the potential difference between the first connection conductor 6D and the third coil portion 10D, and the potential difference between the first connection conductor 6D and the second coil portion 9D. As a result, in the multilayer coil component 1D, the distance between the first connection conductor 6D and the coil portion becomes larger in the order of the distance L1 between the first connection conductor 6D and the first coil portion 8D, the distance L3 between the first connection conductor 6D and the third coil portion 10D, and the distance L2 between the first connection conductor 6D and the second coil portion 9D.

The distance L1 is the shortest distance between the first connection conductor 6D and the first coil portion 8D (the coil conductor layers 52*b* to 52*d*). The distance L2 is the shortest distance between the first connection conductor 6D and the second coil portion 9D (the coil conductor layers 52*g* and 52*h*). The distance L3 is the shortest distance between the first connection conductor 6D and the third coil portion 10D (the coil conductor layers 52*e* and 52*f*). In FIG. 15, the distance L1, the distance L2, and the distance L3 are shown as an example for convenience and may differ from the actual shortest distance.

A diameter of the first coil portion 8D, a diameter of the second coil portion 9D, and a diameter of the third coil portion 10D are different. The diameter of the first coil portion 8D is larger than each of the diameter of the second coil portion 9D and the diameter of the third coil portion 10D. The diameter of the third coil portion 10D is larger than the diameter of the second coil portion 9D. A coil axis of the first coil portion 8D, a coil axis of the second coil portion 9D, and a coil axis of the third coil portion 10D do not coincide with each other. The coil axis of the second coil portion 9D is located closer to the end surface 2*b* than the coil axis of the first coil portion 8D and the coil axis of the third coil portion 10D. The coil axis of the third coil portion 10D is located closer to the end surface 2*b* than the coil axis of the first coil portion 8D.

An edge of the first coil portion 8D, an edge of the second coil portion 9D, and an edge of the third coil portion 10D on a side of the end surface 2*b* of the element body 2 coincide with each other in the first direction D1. Specifically, when viewed in the first direction D1, parts of the coil conductor layer 52*b* and coil conductor layer 52*d* constituting the first coil portion 8D, a part of the coil conductor layer 52*h* constituting the second coil portion 9D, and a part of the coil conductor layer 52*f* constituting the third coil portion 10D overlap each other.

The second coil portion 9D and the third coil portion 10D do not overlap the first terminal electrode 3 when viewed in the first direction D1. That is, the second coil portion 9D and the third coil portion 10D are not located above the first terminal electrode 3. Specifically, the coil conductor layers 52*e* to 52*h* do not overlap the first terminal electrode 3 when viewed in the first direction D1.

As described above, in the multilayer coil component 1D according to the present embodiment, similarly to the multilayer coil component 1, the distance L2 between the first connection conductor 6D and the second coil portion 9D is larger than each of the distance L1 between the first connection conductor 6D and the first coil portion 8D and the distance L3 between the first connection conductor 6D and the third coil portion 10D. As a result, in the multilayer coil component 1D, the second coil portion 9D and the third coil portion 10D with a large potential difference from the first connection conductor 6D are disposed farther from the first connection conductor 6D than the first coil portion 8D. Therefore, in the multilayer coil component 1D, stray capacitance formed between the first connection conductor 6D and the second coil portion 9D can be reduced. Further, in the multilayer coil component 1D, the diameter of the first coil portion 8D can be increased. Therefore, the inductance of the coil 5D can be increased. As described above, in the multilayer coil component 1D, it is possible to suppress the generation of stray capacitance and to increase the characteristics.

In the multilayer coil component 1D according to the present embodiment, the distances L1, L2, and L3 between the first connection conductor 6D and the first, second, and third coil portions 8D, 9D, and 10D are set on the basis of a potential difference generated when the multilayer coil component 1D is used. Specifically, in the multilayer coil component 1D, the distances L1, L2, and L3 between the first connection conductor 6D and the first, second, and third coil portions 8D, 9D, and 10D are set such that the larger a potential difference between the coil portion and the first connection conductor 6D, the larger a distance between the coil portion and the first connection conductor 6D. In this configuration, since the distance is set according to the potential difference, the stray capacitance can be reduced.

Although the embodiments of the present invention have been described above, the present invention is not necessarily limited to the above described embodiments, and various modifications can be made without departing from the gist thereof.

In the above embodiments, a configuration in which each of the first terminal electrode 3 and the second terminal electrode 4 has a rectangular shape has been described as an example. However, the shape of each of the first terminal electrode 3 and the second terminal electrode 4 is not limited to this.

In the above embodiments, a configuration in which the first connection conductor 6, 6C, 6D and the second connection conductor 7, 7C, 7D are disposed at diagonal positions has been described as an example. However, the first connection conductor 6, 6C, 6D and the second connection conductor 7, 7C, 7D may be disposed at other positions.

In the above embodiment, a configuration in which each of the first connection conductor 6, 6C, 6D and the second connection conductor 7, 7C, 7D has a shape of a circular column have been described as an example. However, the shape of each of the first connection conductor 6, 6C, 6D and the second connection conductor 7, 7C, 7D is not limited to this and may be a triangular column, a prismatic column, or the like.

In the above embodiment, a configuration in which the coil 5 is constituted by a plurality of coil conductor layers 12*b* to 12*h*, the first coil portion 8 is constituted by the coil conductor layers 12*b* to 12*d*, and the second coil portion 9 is constituted by the coil conductor layers 12*e* to 12*h* has been described as an example. However, the number of coil conductor layers constituting the coil 5 is not limited to the above-mentioned value. Further, the number of coil conductor layers constituting the first coil portion 8 and the number of coil conductor layers constituting the second coil portion 9 may be the same or different. Further, the coil 5 may include another coil portion. The same applies to the coil 5A, 5B, 5C, 5D.

What is claimed is:

1. A multilayer coil component comprising:

an element body formed by stacking a plurality of insulator layers and having a pair of end surfaces facing each other, a pair of main surfaces facing each other, and a pair of side surfaces facing each other, one of the main surfaces being a mounting surface;

a coil disposed in the element body and having a coil axis extending in a facing direction of the pair of main surfaces;

a first terminal electrode and a second terminal electrode connected to the coil and disposed on the mounting surface;

a first connection conductor disposed outside the coil in the element body when viewed in the facing direction, extending in the facing direction, and connecting one end of the coil located on a side of the other of the main surfaces and the first terminal electrode to each other; and a second connection conductor connecting the other end of the coil located on a side of the one of the main surfaces and the second terminal electrode, wherein the coil comprises a first coil portion and a second coil portion, each of the first coil portion and the second coil portion being formed on two or more of the plurality of the insulator layers, the first coil portion having the one end of the coil and being disposed on a side of the other of the main surfaces, the second coil portion having the other end of the coil and being disposed on a side of the one of the main surfaces, and wherein a shortest distance between the first connection conductor and the second coil portion is larger than a shortest distance between the first connection conductor and the first coil portion.

2. The multilayer coil component according to claim 1, wherein a diameter of the first coil portion and a diameter of the second coil portion are different, and wherein a part of an outer edge of the first coil portion and a part of an outer edge of the second coil portion overlap each other when viewed in the facing direction.

3. The multilayer coil component according to claim 1, wherein the first terminal electrode and the second coil portion do not overlap each other when viewed in the facing direction.

4. The multilayer coil component according to claim 1, wherein a distance between the first connection conductor and the coil is set on the basis of a potential difference between the first connection conductor and the coil during use, and wherein the distance is longer at a position where the potential difference is large than at a position where the potential difference is smaller than at the position where the potential difference is large.

* * * * *